(12) United States Patent
Gernov et al.

(10) Patent No.: US 6,194,099 B1
(45) Date of Patent: Feb. 27, 2001

(54) ELECTROCHEMICAL CELLS WITH CARBON NANOFIBERS AND ELECTROACTIVE SULFUR COMPOUNDS

(75) Inventors: Yordan M. Gernov; Zhe-Sheng Xu, both of Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

(21) Appl. No.: 08/995,090

(22) Filed: Dec. 19, 1997

(51) Int. Cl.[7] .............................. H01M 4/60; H01M 4/58; H01M 4/62

(52) U.S. Cl. .................. 429/213; 429/212; 429/215; 429/218.1; 29/623.5

(58) Field of Search ..................... 429/213, 215, 429/212, 218.1; 29/623.5

(56) References Cited

U.S. PATENT DOCUMENTS

| | | |
|---|---|---|
| 3,532,543 | 10/1970 | Nole et al. . |
| 3,639,174 | * 2/1972 | Kegelman ............... 136/20 |
| 3,915,743 | 10/1975 | Lauck . |
| 4,143,214 | 3/1979 | Chang et al. . |
| 4,152,491 | 5/1979 | Chang et al. . |
| 4,303,748 | 12/1981 | Armand et al. . |
| 4,375,427 | 3/1983 | Miller et al. . |
| 4,664,991 | 5/1987 | Perichaud et al. . |
| 4,833,048 | 5/1989 | De Jonghe et al. . |
| 4,917,974 | 4/1990 | De Jonghe et al. . |
| 4,940,524 | 7/1990 | Perineau et al. . |
| 4,945,013 | 7/1990 | Lim . |
| 5,032,473 | 7/1991 | Hoge . |
| 5,053,375 | 10/1991 | Rao . |
| 5,162,175 | 11/1992 | Visco et al. . |
| 5,225,296 | 7/1993 | Ohsawa et al. . |
| 5,246,794 | 9/1993 | Blomgren et al. . |
| 5,324,599 | 6/1994 | Oyama et al. . |
| 5,437,943 | 8/1995 | Fujii et al. . |
| 5,451,476 | 9/1995 | Josefowicz . |
| 5,460,905 | 10/1995 | Skotheim . |
| 5,506,072 | 4/1996 | Griffin et al. . |

(List continued on next page.)

FOREIGN PATENT DOCUMENTS

| | | |
|---|---|---|
| 9-147868 | 6/1997 | (JP) . |
| WO 91/05089 | 4/1991 | (WO) . |
| WO 95/07551 A1 | 3/1995 | (WO) . |
| WO 96/41388 | 12/1996 | (WO) . |

OTHER PUBLICATIONS

Frysz et al., "Carbon filaments and carbon black as a conductive additive to the manganese dioxide cathode of a lithium electrolytic cell," *Journal of Power Sources*, vol. 58, pp. 41–54 (1996). No Month.

Chemical Abstracts, Columbus, OH, U.S., Abstract No. 127:97512, "Secondary sulfide batteries with activated carbon fiber cathodes and the activated carbon fibers" corresponding to JP 9–147868 A2, No Date.

WPINDEX Abstract, Derwent Information Ltd., Accession No. 97–356162 [33], "Sulphide secondary battery for effective use of energy—comprises active carbon fibre as anode electrode material" corresponding to JP 9–147868 A, Mar. 1999.

(List continued on next page.)

*Primary Examiner*—Stephen Kalafut
*Assistant Examiner*—Tracy Dove
(74) *Attorney, Agent, or Firm*—Morrison & Foerster LLP

(57) ABSTRACT

The present invention pertains to solid composite cathodes which comprise (a) an electroactive sulfur-containing cathode material which, in its oxidized state, comprises a polysulfide moiety of the formula, $-S_m-$, wherein m is an integer from 3 to 10; and (b) non-activated carbon nanofibers. The present invention also pertains to electric current producing cells comprising such solid composite cathodes, and methods of making such solid composite cathodes and electric current producing cells.

47 Claims, 6 Drawing Sheets

(a)

(b)

U.S. PATENT DOCUMENTS

| | | | |
|---|---|---|---|
| 5,512,214 | * | 4/1996 | Koksbang .............................. 252/506 |
| 5,514,496 | | 5/1996 | Mishima et al. . |
| 5,516,598 | | 5/1996 | Visco et al. . |
| 5,529,860 | * | 6/1996 | Skotheim et al. .................... 429/213 |
| 5,532,077 | | 7/1996 | Chu . |
| 5,538,812 | | 7/1996 | Lee et al. . |
| 5,542,163 | | 8/1996 | Chang . |
| 5,576,162 | | 11/1996 | Papadopoulos . |
| 5,601,947 | | 2/1997 | Skotheim et al. . |
| 5,690,702 | | 11/1997 | Skotheim et al. . |
| 5,723,230 | * | 3/1998 | Naoi et al. ............................ 429/104 |

OTHER PUBLICATIONS

Frysz, C.; Shui, X. and Chung, D., "Carbon Filaments and Carbon Black as a Conductive Additive to the Manganese Dioxide Cathode of a Lithium Electrolytic Cell", *J. Power Sources*, vol. 58, pp. 41–54 (1996), No Month.

Frysz, C.; Shui, X. and Chung, D., "Use of Submicron Carbon Filaments in Place of Carbon Black as a Porous Reduction Electrode in Lithium Batteries with a Catholyte Comprising Bromine Chloride in Thionyl Chloride", *Mat. Res. Soc. Symp. Proc.*, vol 393, pp. 367–371 (1995), No Month.

Rodriguez, N., "A Review of Catalytically Grown Carbon Nanofibers", *J. Mater. Res.*, vol. 8, No. 12, pp. 3233–3250, Dec. 1993.

Shui, X.; Frysz, C. and Chung, D., "Improving the Electrochemical Performance of Carbon Filaments by Solvent Cleansing", *Mat. Res. Soc. Symp. Proc.*, vol. 393, pp. 315–319 (1995), No Month.

* cited by examiner (a)

(b)

ELECTROCHEMICAL CELLS WITH CARBON NANOFIBERS AND ELECTROACTIVE SULFUR COMPOUNDS

TECHNICAL FIELD

The present invention pertains generally to the field of cathodes and electric current producing cells. More particularly, the present invention pertains to solid composite cathodes which comprise (a) an electroactive sulfur-containing cathode material, which in its oxidized state, comprises a polysulfide moiety of the formula, $-S_m-$, wherein m is an integer from 3 to 10; and (b) non-activated carbon nanofibers. The present invention also pertains to electric current producing cells comprising such composite cathodes, and to methods of making such composite cathodes and electric current producing cells.

BACKGROUND

Throughout this application, various publications, patents and published patent applications are referred to by an identifying citation. The disclosures of the publications, patents, and published patent applications referenced in this application are hereby incorporated by reference into the present disclosure to more fully describe the state of the art to which this invention pertains.

An electroactive material that has been fabricated into a structure for use in a battery is referred to as an electrode. Of a pair of electrodes used in a battery, herein referred to as an electric current producing cell, the electrode on the electrochemically higher potential side is referred to as the positive electrode, or the cathode, while the electrode on the electrochemically lower potential side is referred to as the negative electrode, or the anode.

An electrochemically active material used in the cathode or positive electrode is referred to hereinafter as a cathode active material. An electrochemically active material used in the anode or negative electrode is hereinafter referred to as an anode active material. An electric current producing cell or battery comprising a cathode with the cathode active material in an oxidized state and an anode with the anode active material in a reduced state is referred to as being in a charged state. Accordingly, an electric current producing cell comprising a cathode with the cathode active material in a reduced state, and an anode with the anode active material in an oxidized state, is referred to as being in a discharged state.

As the evolution of batteries continues, and particularly as lithium batteries become more widely accepted for a variety of uses, the need for safe, long lasting, high energy batteries becomes more important. There has been considerable interest in recent years in developing high energy density cathode-active materials and alkali metals as anode active materials for high energy primary and secondary batteries.

To achieve high capacity in electric current producing cells or batteries, it is desirable to have a high quantity or loading of electroactive material in the cathode layer. For example, the volume of cathode coating layer in an AA size battery is typically about 2 cm$^3$. If the specific capacity of the electroactive material is 1000 mAh/g, the amount or volumetric density of the electroactive material in the cathode coating layer would need to be at least 500 mg/cm$^3$ in order to have the 1 gram of cathode active material in the AA size battery necessary to provide a capacity of 1000 mAh or 1 Ah. If the volumetric density of electroactive material in the cathode coating layer can be increased to higher levels, such as greater than 700 mg/cm$^3$, the capacity of the battery can be proportionately increased to higher levels.

There are a wide variety of electroactive materials that are utilized in the cathode layers of electric current producing cells. For example, a number of these are described in copending U.S. patent application Ser. No. 08/859,996, titled "Novel Composite Cathodes, Electrochemical Cells Comprising Novel Composite Cathodes, and Processes for Fabricating Same" by common assignee. These electroactive materials vary widely in their specific densities and in their specific capacities so the desired volumetric densities in mg/cm$^3$ correspondingly vary over a wide range. Lithium and sulfur are highly desirable as the electrochemically active materials for the anode and cathode, respectively, of electric current producing cells because they provide nearly the highest energy density possible on a weight or volume basis of any of the known combinations of active materials. To obtain high energy densities, the lithium can be present as the pure metal, in an alloy, or in an intercalated form, and the sulfur can be present as elemental sulfur or as a component in an organic or inorganic material with a high sulfur content, preferably above 50 weight per cent sulfur. For example, in combination with a lithium anode, elemental sulfur has a theoretical specific capacity of 1680 mAh/g, and carbon-sulfur polymer materials with trisulfide and longer polysulfide groups in the polymer have shown specific capacities of 1200 mAh/g. These high specific capacities are particularly desirable for applications, such as portable electronic devices and electric vehicles, where low weight of the battery is important.

Herein, the term "carbon-sulfur polymer materials" means materials comprising carbon-sulfur polymers with carbon-sulfur single bonds and with sulfur-sulfur bonds forming trisulfide (-SSS-) and higher polysulfide linkages. These carbon-sulfur polymer materials comprise, in their oxidized state, a polysulfide moiety of the formula, $-S_m-$, wherein m is an integer equal to or greater than 3. For example, these carbon-sulfur polymer materials are described in U.S. Pat. Nos. 5,601,947; 5,609,702; 5,529,860; and in copending U.S. patent application Ser. No. 08/602,323 to Skotheim et al., now abandoned. Organo-sulfur materials with only disulfide groups typically show specific capacities in the range of 300 to 700 mAh/g and are accordingly less desirable for those applications requiring high specific capacities.

It is well known to those skilled in the art of battery design and fabrication that practical battery cells comprising the electroactive cathode and anode materials also contain other non-electroactive materials such as a container, current collectors, electrode separators, polymeric binders, conductive additives and other additives in the electrodes, and an electrolyte (typically an aqueous or non-aqueous liquid, gel, or solid material containing dissolved salts or ionic compounds with good ionic conductance but poor electronic conductivity). All of these additional non-electroactive components are typically required to make the battery perform efficiently, but they also serve to reduce the gravimetric and volumetric energy density of the cell. It is, therefore, desirable to keep the quantities of these non-electroactive materials to a minimum so as to maximize the amount of electroactive material in the battery cell.

To achieve the highest possible volumetric density of the electroactive material in the cathode coating layer, it is desirable to maximize the weight per cent for electroactive materials in the coating layer, for example, 65 to 85 weight per cent for electroactive materials of a specific density of 2 g/cm$^3$, and to maintain the porosity or air voids in the cathode coating layer as low as possible, for example, 40 to 60 volume percent. Particularly, the porosity of the cathode coating layer must be kept low because higher porosities, for example, 70 to 85 volume per cent, do not provide enough electroactive material to obtain very high cell capacities. With the electroactive transition metal oxides, this is often relatively easy to achieve because these oxides typically have electrically conductive properties and are typically microporous so that high levels of added conductive fillers and microporous additives are not required. With electroactive sulfur-based compounds, which have much higher specific capacities than the electroactive transition metal oxides, it is difficult to obtain efficient electrochemical utilization of the sulfur-based compounds at high volumetric densities because the sulfur-based compounds are highly electrically non-conducting or insulative and are generally not microporous. For example, U.S. Pat. No. 5,532,077 to Chu describes the problems of overcoming the insulating character of elemental sulfur in composite cathodes and the use of a preferably homogeneous distribution of an electronically conductive material, such as carbon black, and of an ionically conductive material in the composite electrode to try to overcome these problems.

To overcome these limitations with electroactive sulfur-based compounds, large amounts of electrically conductive fillers, such as conductive carbons, are typically added to the cathode coating layer. However, the formation of insulating sulfur coatings on the conductive carbon and current collector has been observed which isolates these components from the rest of the cell components and leads to poor electrochemical capacity and cycling. U.S. Pat. No. 3,639,174 to Kegelman describes composite cathodes comprising elemental sulfur and a particulate electrical conductor. U.S. Pat. No. 4,303,748 to Armand et al. describes composite cathodes containing an ionically conductive polymer electrolyte together with elemental sulfur, transition metal salts, or other cathode active materials for use with lithium or other anode active materials in which, for example, the active sulfur or other cathode active material and the inert compounds with electrical conduction, such as graphite powder, are both particles of between 1 to 500 microns in diameter. U.S. Pat. No. 5,162,175 to Visco et al. describes the use of 1 to 20 weight percent of particles, such as carbon black, to provide electrical conductivity in solid composite organo-sulfur cathodes containing electroactive disulfide materials. U.S. Pat. No. 5,460,905 to Skotheim describes the use of p-doped conjugated polymers, together with an effective amount of conductive carbon pigments, for the transport of electrons in sulfur-based cathodes. U.S. Pat. No. 4,375,427 to Miller et al. describes conductive polymers for use in composite cathodes where the conductive polymers are reinforced with glass, asbestos, or metal fibers or with conductive carbon or graphite pigments and where the conductive polymers are in the form of a fiber. U.S. Pat. No. 5,324,599 to Oyama et al. describes the use of a combination of a compound having an electroactive disulfide group and a conductive polymer, preferably having a porous fibril structure, for organo-sulfur composite cathodes. U.S. Pat. No. 5,529,860 and U.S. patent application Ser. No. 08/602,323 to Skotheim et al. describe the use of conductive carbons and graphites, conductive polymers, and metal fibers, powders, and flakes as conductive fillers with carbon-sulfur polymer materials.

Another approach to obtain electrical conductivity with sulfur-based cathodes is to introduce metallic conductivity into the normally insulating sulfur-based material. U.S. Pat. No. 5,516,598 to Visco et al. discloses composite cathodes comprising metal-organosulfur charge transfer materials with one or more metal-sulfur bonds, wherein the oxidation state of the metal is changed in charging and discharging the positive electrode or cathode. The metal ion provides electrical conductivity to the material, although it significantly lowers the cathode energy density and capacity per unit weight of the polyorgano-disulfide material and does not enhance the microporosity of the cathode coating layer.

It would be advantageous to significantly increase the volumetric densities of electroactive sulfur-based cathodes without sacrificing the high specific capacity of these materials, i.e., without reducing the high electrochemical utilization during cycling of the cells. Particularly as the cathode coating thickness is increased, it becomes progressively more difficult to achieve the electrical conductivity and microporosity needed for highly efficient utilization of the sulfur-based materials. For example, it would be very beneficial to the capacity of the batteries if the volumetric density of cathode active material could be increased by 50% or 100%. One method to increase the volumetric density of the cathode coating is by compressing or calendering the coating layer to a reduced thickness. It would be very advantageous to be able to compress or calender the cathode coating layer to a 20% or greater reduction in thickness without sacrificing the high specific capacity of the electroactive sulfur-based materials.

With electroactive sulfur-based compounds, higher volumetric density through reduced porosity of the cathode coating layer is typically useful in suppressing the out-diffusion of reduced sulfide compounds from the cathode during cycling of the battery. This contributes to a lower rate of loss of capacity during cycling of the battery.

Japanese Patent Publication No. 09-147868, published Jun. 6, 1997, describes the use of active carbon fibers to absorb electroactive sulfur compounds in cathodes of secondary batteries and to provide increased cycle life at high discharge currents. These active carbon fibers are characterized by highly microporous structures with specific surface areas above 1000 $m^2/g$, which absorb large amounts of sulfur compounds, such as 30 to 50 weight per cent, into the pores. These active carbon fibers also have diameters greater than 1 micron, typically in the range of 2 to 6 microns. There is no mention of non-activated carbon filaments or nanofibers with submicron diameters.

The use of fibers of different types in solid cathodes not containing sulfur-based active materials has been reported. For example, *J Power Sources*, 1996, 58, 41–54 by Frysz et al. describes the use of carbon filaments or nanofibers to provide improved cathode absorptivity to electrolytes, compressibility and packing density, bindability and mechanical strength, and reduced polarization when the carbon filaments are substituted for carbon black in $MnO_2$ cathodes with lithium anodes. In Mat. Res. Soc. Symp. Proc. 1995, 393, 367–371, by Frysz et al., the use of submicron carbon filaments in place of carbon black as porous reduction electrodes in carbon limited lithium batteries with bromine chloride in thionyl chloride catholyte is described. U.S. Pat. No. 5,514,496 to Mishima et al. describes the use of a conducting agent of carbon or metallic fibers and of a filler of a fibrous material undergoing no chemical change, such as fibers of polyolefins, glass, and carbon. Also, for example, U.S. Pat. No. 5,437,943 to Fujii describes the use of electroconductive auxiliary agents, such as carbon or metal fibers, to provide voids in a cathode containing electroactive vanadium oxide and a conducting polymer. The purpose of the voids is to hold electrolyte components. U.S. Pat. Nos. 5,032,473 to Hoge and 5,053,375 to Rao disclose the use of a web of conductive carbon fibers with carbon particles or silver-adsorbed carbon particles in metal/air batteries. U.S.

Pat. No. 5,225,296 to Ohsawa et al. discloses an electrode of a porous carbon sheet of carbon fibers and carbon particles. U.S. Pat. No. 5,451,476 to Josefowicz describes a composite carbon fiber and electrically conductive polymer cathode where the conductive polymer is on the surface of carbon fibers, typically about 1 micron in diameter. U.S. Pat. No. 4,940,524 to Perineau et al. discloses the use of carbon or graphite fibers in cathodes containing a Raney metal.

Another approach to provide the necessary electrical conductivity with solid sulfur-based cathodes has been to impregnate or coat a carbon or graphite felt material with the sulftir-based electroactive material. Often, the conductive felt material has the function of the current collector that provides good electrical conductivity between the positive electrode and a metal container, as, for example, described in U.S. Pat. No. 5,516,598 to Visco et al. Typically, the felt material is a current collector substrate to the cathode coating layer or is an intermediate matrix layer between the cathode coating layer and the current collector and, as such, the conductive fibers do not extend tlroughout the cathode layer. U.S. Pat. No. 5,542,163 to Chang describes the use of carbon in the form of powder, flakes, beads, or fibers as an adhesion promoting layer between a cathode and a current collector. The carbon or graphite fibers in these various felt materials have physical dimensions, such as diameters greater than 1 micron, similar to those of the active carbon fibers described above for Japanese Patent Publication No. 09-147868, published Jun. 6, 1997. U.S. Pat. No. 3,532,543 to Nole et al. describes the use of a porous carbon cloth structure to provide enough porosity to allow good electrolyte penetration into cathodes with elemental sulfur as the active material, preferably in a mixture with a particulate conductive carbon and a suitable binder. U.S. Pat. No. 5,506,072 to Griffin et al. describes a woven graphite sheet electrode packed around with large particles of elemental sulfur and conductive graphite pigments. U.S. Pat. No. 3,915,743 to Lauck discloses the use of 2 to 10 per cent by weight of asbestos fibers in composite cathodes of elemental sulfur and conductive carbon or graphite powder. The asbestos fiber is stated to increase the porosity of the sulfur electrode. However, asbestos fibers are not electrically conductive and have safety and environmental limitations.

U.S. Pat. No. 4,833,048 to Dejonghe et al. describes an electronically conductive matrix of carbon or aluminum fibers, preferably graphite felt, dispersed throughout a liquid organo-sulfur cathode having disulfide electroactive materials to provide good electrical conductivity between the positive electrode and the metal container. U.S. Pat. No. 4,945,013 to Lim describes the use of a graphite fiber matrix for the liquid sodium polysulfide cathode of a sodium-sulfur battery. In a sodium-sulfur cell, both the sulfur cathode and the sodium anode are liquid at the operating temperatures of the cell. U.S. Pat. No. 5,246,794 to Blomgren et al. describes a cathode current collector of carbon fibers for use with liquid cathodes where the carbon fibers have a diameter of 0.2 microns or less. Liquid sulfur-based cathodes are typically electrochemically irreversible and not practical for use in rechargeable cells. Liquid sulfur-based cathodes are substantially different from solid sulfur-based cathodes in a number of other ways in addition to electrochemical reversibility and, for example, do not have the stringent requirements for microporosity and for access of electrolyte to a high surface area of solid sulfur-based material as in a solid sulfur-based cathode layer.

Despite the various approaches proposed for the fabrication of high energy density rechargeable cells comprising elemental sulfur, organo-sulfur, or carbon-sulfur polymer materials in a solid composite cathode, there remains a need for improved composite cathodes comprising electroactive sulfur materials, which have a combination of excellent access to the electrolyte and high electrochemical utilization while retaining or improving the desirable properties of electrical conductivity, mechanical strength, compressibility, and adhesion in solid composite cathodes utilizing electroactive sulfur materials, such as, elemental sulfur and carbon-sulfur polymer materials.

SUMMARY OF THE INVENTION

One aspect of the present invention pertains to a solid composite cathode for use in an electric current producing cell comprising (a) an electroactive sulfur-containing cathode material, which material, in its oxidized state, comprises a polysulfide moiety of the formula $-S_m-$, wherein m is an integer from 3 to 10, and (b) non-activated carbon nanofibers.

In one embodiment, the carbon nanofibers have a diameter of less than about 1000 nm (typically from about 10 nm to about 1000 nm). In one embodiment, the carbon nanofibers have a diameter of less than about 500 nm (typically from about 10 nm to about 500 nm). In one embodiment, the carbon nanofibers have a diameter of less than about 200 nm (typically from about 10 nm to about 200 nm). In one embodiment, the carbon nanofibers have a diameter of less than about 100 nm (typically from about 10 nm to about 100 nm).

In one embodiment, the carbon nanofibers have an aspect ratio (which is defined as the ratio of the nanofiber's length to its diameter) of at least 20 (typically from about 20 to about 500). In one embodiment, the carbon nanofibers have an aspect ratio of at least 50 (typically from about 50 to about 500).

In one embodiment, the carbon nanofibers have a specific surface area of less than about 600 $m^2/g$ (typically from about 50 $m^2/g$ to about 600 $m^2/g$). In one embodiment, the carbon nanofibers have a specific surface area of less than about 500 $m^2/g$ (typically from about 50 $m^2/g$ to about 500 $m^2/g$). In one embodiment, the carbon nanofibers have a specific surface area of less than about 400 $m^2/g$ (typically from about 50 $m^2/g$ to about 400 $m^2/g$). In one embodiment, the carbon nanofibers have a specific surface area of less than about 300 $m^2/g$ (typically from about 50 $m^2/g$ to about 300 $m^2/g$). In one embodiment, the carbon nanofibers have a specific surface area of less than about 200 $m^2/g$ (typically from about 50 $m^2/g$ to about 200 $m^2/g$). In one embodiment, the carbon nanofibers have a specific surface area of less than about 100 $m^2/g$ (typically from about 50 $m^2/g$ to about 100 $m^2/g$).

The solid composite cathodes of the present invention comprise an electroactive sulfur-containing cathode material, which material, in its oxidized state, comprises a polysulfide moiety of the formula $-S_m-$, wherein m is an integer from 3 to 10. In one embodiment, m is an integer from 3 to 8. In one embodiment, m is an integer from 3 to 6. In one embodiment, m is an integer from 6 to 10. In one embodiment, the polysulfide linkage comprises -S-S-S- (i.e., trisulfide). In one embodiment, the polysulfide linkage comprises -S-S-S-S- (i.e., tetrasulfide). In one embodiment, the polysulfide linkage comprises -S-S-S-S-S- (i.e., pentasulfide). In one embodiment, the polysulfide linkage comprises -S-S-S-S-S-S- (i.e., hexasulfide). In one embodiment, the polysulfide linkage comprises -S-S-S-S-S-S-S- (i.e., heptasulfide). In one embodiment, the polysulfide linkage comprises -S-S-S-S-S-S-S-S- (i.e., octasulfide).

In one embodiment, the solid composite cathodes of the present invention further comprise a conductive filler in addition to the non-activated carbon nanofibers. Examples of suitable conductive fillers include, but are not limited to, conductive carbons, graphites, active carbon fibers, metal flakes, metal powders, metal fibers, electrically conductive polymers, and electrically conductive metal chalcogenides.

In one embodiment, the solid composite cathodes of the present invention further comprise a binder.

In one embodiment, the solid composite cathodes of this invention further comprise an electrolyte.

Another aspect of the present invention pertains to electric current producing cells which comprise an anode; a solid composite cathode of the present invention, as described herein; and an electrolyte interposed between the anode and the composite cathode.

Examples of suitable anode active materials for use in the anodes of the cells of the present invention include, but are not limited to, lithium metal, lithium-aluminum alloys, lithium-tin alloys, lithium-intercalated carbons, and lithium-intercalated graphites.

Examples of suitable electrolytes for use in cells of the present invention include, but are not limited to, liquid electrolytes, gel polymer electrolytes, and solid polymer electrolytes.

In a preferred embodiment, the electrolyte comprises one or more ionic electrolyte salts and one or more polymers selected from the group consisting of: polyethers, polyethylene oxides, polypropylene oxides, polyimides, polyphosphazenes, polyacrylonitriles, polysiloxanes; derivatives of the foregoing; copolymers of the foregoing; and blends of the foregoing.

In a preferred embodiment, the electrolyte for the cell of this invention comprises one or more ionic electrolyte salts and one or more electrolyte solvents selected from the group consisting of: N-methyl acetamide, acetonitrile, carbonates, sulfolanes, sulfones, N-alkyl pyrrolidones, dioxolanes, glymes, and siloxanes.

Yet another aspect of the present invention pertains to methods of manufacturing a solid composite cathode, as described herein.

Still another aspect of the present invention pertains to methods of manufacturing an electric current producing cell which employs a solid composite cathode, as described herein.

As one of skill in the art will appreciate, features of one embodiment and aspect of the invention are applicable to other embodiments and aspects of the invention.

DETAILED DESCRIPTION OF THE INVENTION

Figure 1:
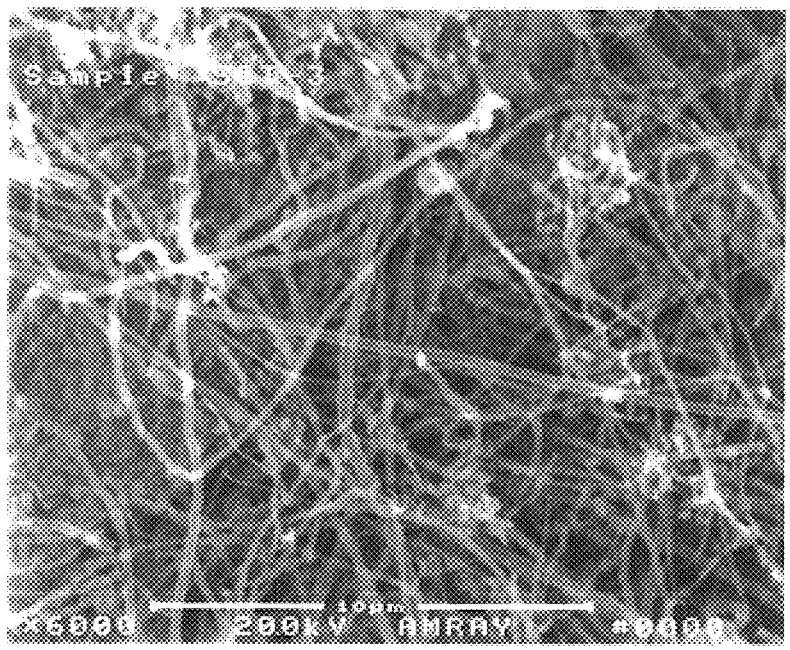
FIG. 1 shows (a) a SEM photograph of the surface of a cathode coating layer containing carbon nanofibers and (b) a SEM photograph of the surface of a cathode coating layer with no carbon nanofibers present.
Figure 1:
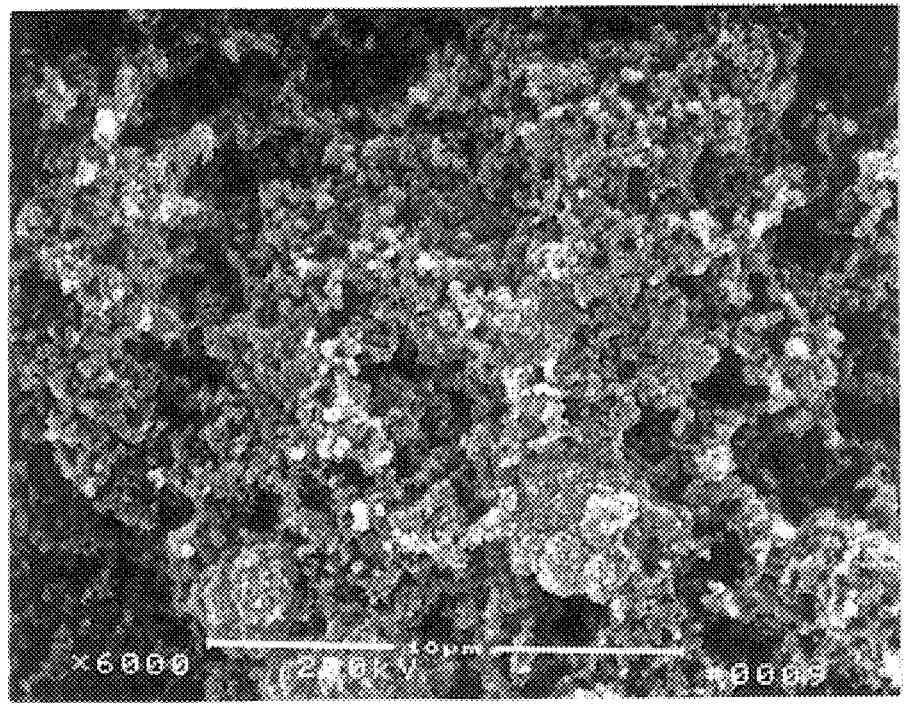

One aspect of the present invention pertains to a solid composite cathode for use in an electric current producing cell comprising (a) an electroactive sulfur-containing cathode material, which material, in its oxidized state, comprises a polysulfide moiety of the formula, $-S_m-$, wherein m is an integer from 3 to 10, and (b) non-activated carbon nanofibers. The solid composite cathodes of the present invention are particularly preferred for use in electrolytic cells, rechargeable batteries, fuel cells, and the like, which comprise electroactive sulfur-containing cathode materials and which require high energy density.

Carbon Nanofibers

The term "nanofiber," as used herein, pertains to fibers in the form of hollow tubes or in the form of solid cylinders, which fibers have diameters of less than about 1000 nanometers (typically from about 10 nm to about 1000 nm) and lengths of about 1 to about 200 microns. The term "carbon nanofibers," as used herein, relates to nanofibers which comprise elemental carbon. In some embodiments, the carbon nanofibers consist essentially of elemental carbon. The term "carbon filaments" is interchangeably used herein with the term "carbon nanofiber."

In one embodiment, the carbon nanofibers have a diameter of less than about 1000 nm (typically from about 10 nm to about 1000 nm). In one embodiment, the carbon nanofibers have a diameter of less than about 500 nm (typically from about 10 nm to about 500 nm). In one embodiment, the carbon nanofibers have a diameter of less than about 200 nm (typically from about 10 nm to about 200 nm). In one embodiment, the carbon nanofibers have a diameter of less than about 100 nm (typically from about 10 nm to about 100 nm).

In one embodiment, the carbon nanofibers have an aspect ratio (which is defined as the ratio of the nanofiber's length to its diameter) of at least 20 (typically from about 20 to about 500). In one embodiment, the carbon nanofibers have an aspect ratio of at least 50 (typically from about 50 to about 500).

The term "non-activated carbon," as used herein, pertains to elemental carbon in a form which, in contrast with activated carbon, is not highly microporous, which has a low pore volume and a low internal surface area, and which does not significantly adsorb materials such as inorganic polysulfides. The non-activated nature of the carbon nanofibers of the present invention is a characteristic of the vapor-growth process by which they are prepared.

Typically, non-activated carbons have specific surface areas of less than about 600 $m^2/g$, as measured using the Brunnauer-Emmett-Teller ("BET") method of physical adsorption using nitrogen as the adsorptive material. In one embodiment, the carbon nanofibers have a specific surface area of less than about 500 $m^2/g$ (typically from about 50 $m^2/g$ to about 500 $m^2/g$). In one embodiment, the carbon nanofibers have a specific surface area of less than about 400 $m^2/g$ (typically from about 50 $m^2/g$ to about 400 $m^2/g$). In one embodiment, the carbon nanofibers have a specific surface area of less than about 300 m²/g (typically from about 50 m²/g to about 300 m²/g). In one embodiment, the carbon nanofibers have a specific surface area of less than about 200 m²/g (typically from about 50 m²/g to about 200 m²/g). In one embodiment, the carbon nanofibers have a specific surface area of less than about 100 m²/g (typically from about 50 m²/g to about 100 m²/g).

For example, suitable non-activated carbon nanofibers for use in the present invention include, but are not limited to, PYROGRAF-III carbon nanofibers (a trade name for carbon filaments available from Applied Sciences, Inc., Cedarville, Ohio) which have a nominal diameter of 200 nm and a specific surface area (BET method) of 65 m²/g.

By contrast, active carbon fibers have diameters greater than 1000 nm and specific surface areas greater than 700 m²/g, and typically greater than 1000 m²/g. The activated nature of the active carbon fibers is shown by their extraordinarily large internal surface area and pore volume which arise as a result of special processing to develop internal porosity. For example, active carbon fibers obtained from the pyrolysis of rayon fibers had a nominal diameter of 2000 nm and a specific surface area (BET method) of 1500 m²/g.

The non-activated nature of the carbon nanofibers used in the present invention (which have low internal surface area and low pore volume) is further illustrated by their low adsorptive affinity for lithium octasulfide in solution. For example, when a 10 ml solution of 0.03 M $Li_2S_8$ in tetraglyme was mixed with 0.5 g of carbon nanofibers (PYROGRAF-III), only 13% of the lithium octasulfide was adsorbed. In contrast, when the active carbon fibers from rayon pyrolysis, as described above, were substituted for the carbon nanofibers, the active carbon fibers adsorbed 74% of the lithium octasulfide under the same conditions.

Since the non-activated carbon nanofibers used in the present invention have a diameter of less than 1000 nm, preferably less than 500 nm, more preferably less than 200 nm, and most preferably less than 100 nm, they are highly flexible even in relatively thin coatings of only 10 microns in thickness and show the tendency for individual fibers to extensively intertwine among each other to form a highly random, three-dimensional network in the cathode coating layer. This provides significant microporosity throughout the cathode coating layer. As shown in FIG. 1(a), scalming electron microscope (SEM) photographs of cathode coating layers of the present invention confirm the presence of this highly random, three-dimensional network with significant microporosity in the coating even though the non-activated carbon nanofibers are substantially nonporous. As shown in FIG. 1(b), this microporosity in the coating is substantially reduced when no carbon nanofibers are present. This physical network of the intertwined non-activated carbon nanofibers is significantly retained even during calendering or compression of the cathode coating layer by about 40%.

By contrast, carbon fibers with diameters greater than 1000 nm, typically in the range of 2000 to 3000 nm, are proportionately stiffer and less flexible than the non-activated carbon nanofibers. For the dual reasons of their greater thickness and greater stiffness, the carbon fibers do not intertwine and coil among themselves nearly as effectively as the carbon nanofibers. This can especially be observed in SEM photographs of the coating surface as the cathode coating layer becomes thinner, as, for example, when reducing the thickness from 60 microns down to 30 microns, and more so as the thickness is further reduced to about 10 microns. Also, the submicron diameter of the non-activated carbon nanofibers is beneficial to cathode capacity and stability during cycling of the electric current producing cells by reducing the amount of large pores or void space and of coating non-uniformities in the cathode coating layer found when carbon fibers of diameters greater than 1 micron are used.

As supplied, the non-activated carbon nanofibers typically have lengths in the range of 50 to 150 microns. The blending and mixing processes of making the composite cathode coating mixes, especially those dry or wet steps when the carbon nanofibers are ground together with other materials, chop the carbon nanofibers into shorter lengths. The optimum distribution of lengths is dependent on various factors, including the specific formulation of the cathode coating and the thickness of the cathode coating layer, and needs to be determined for each specific solid cathode coating layer. Generally, the improvements found with the use of carbon nanofibers are largely lost if the length becomes too short, for example, less than 2 microns. The very short lengths do not provide the proper microporosity to the cathode coating layer. Preferably, the lengths of the carbon nanofibers are at least 4 microns, and most preferably, at least 10 microns. Generally, the improvements found with the use of carbon nanofibers are very effective when the length is about the thickness of the cathode coating layer. For example, for a cathode coating layer of 20 microns in thickness, carbon nanofibers are particularly effective when present in lengths in the range of 10 to 30 microns. In the case of PYROGRAF-III carbon nanofibers with a nominal thickness of 200 nm, this particularly effective range is a length to diameter ratio or aspect ratio in the range of 50 to 150 for this cathode coating layer of 20 microns in thickness.

Non-activated carbon nanofibers are typically grown from the catalytic decomposition of hydrocarbons over ultrafine metal catalysts and are known to exist as ultrathin fibers in a variety of forms including hollow tubes, solid cylinders, twisted, helical, branched, and bidirectional as, for example, described in "A Review of Catalytically Grown Carbon Nanofibers," *J Mater. Res.* 1993, 8(12), 3233–3250, by Rodriguez. These carbon nanofibers are also known to exist with some residual metal catalyst in the nanofiber and in oxidized or other chemically reacted forms, as also described in the aforementioned article by Rodriguez.

During the preparation of non-activated carbon nanofibers for use in the present invention, impurities are often retained on the surface of the nanofibers. To avoid any potential interference by these impurities with the electrical conductivity and other desired properties of the carbon nanofibers, it is advisable to wash the nanofibers with an appropriate solvent to extract any impurities, for example, as described in *J. Power Sources* 1996, 58, 41–54 by Frysz et al. and in *Mat. Res. Soc. Symp. Proc.* 1995, 393, 315–319 by Shui et al. The impurities are often hydrocarbons which can be extracted from the carbon nanofibers by washing them with an organic solvent, such as acetone. The washing can be done by immersing the carbon nanofibers in the organic solvent and stirring this mixture. Extraction of the impurities from the nanofibers is shown by an increase in the color of the solvent from colorless to dark. The nanofibers can then separated from the solvent by filtration through a filter paper. This washing process is repeated until the solvent remains colorless or lightly colored after the stirring. Typically, the washing must be repeated at least 3 times.

Non-activated carbon nanofibers which are suitable for use in the present include, but are not limited to, PYROGRAPH-III carbon nanofibers available from Applied Sciences, Inc., Cedarville, Ohio.

Use of non-activated carbon nanofibers enables the solid composite cathode to have a highly porous structure which provides excellent access of the electrolyte to the electroactive sulfur materials, while also providing increased mechanical strength, increased electrical conductivity throughout the thickness of the composite cathode, adaptability for compression and expansion of the composite cathode during electrochemical cycling, ease of calendering or compressing the composite cathode to a desired thickness without interfering with the desired access to electrolyte during filling or cycling of the cells, and increased adhesion to the current collector substrate and to any overlying layers, such as a coated layer to inhibit migration of cathode materials out of the cathode or a coated separator or electrolyte layer. Because electroactive sulfur materials, such as elemental sulfur and carbon-sulfur polymer materials, have poor electrical conductivity and generally very low porosity, it has been problematical to achieve the combination of excellent access to electrolyte and high electrochemical utilization while retaining or improving the desirable properties of electrical conductivity, mechanical strength, compressibility, and adhesion in solid composite cathodes utilizing electroactive sulfur materials.

Carbon nanofibers are well known materials that have found a variety of uses.

Thus, for example, N. M. Rodriguez in "A Review of Catalytically Grown Carbon Nanofibers", *J. Mater. Res.* 1993, 8(12). 3233–3250, describes their use as catalysts and catalyst supports, as adsorption agents, in fibrous composites, and in capacitors. Also, for example, U.S. Pat. No. 5,576,162 to Papadopoulos describes a dispersion of carbon nanofibers in a film-forming binder for use in the electrically-conductive layer of an imaging element. However, heretofore there has been no disclosure of the use of non-activated carbon nanofibers in a solid composite cathode of electroactive sulfur-containing cathode materials for use in electric current producing cells.

Electroactive Sulfur-Containing Cathode Materials

One aspect of the present invention pertains to a solid composite cathode for use in an electric current producing cell comprising (a) an electroactive sulfur-containing cathode material, which material, in its oxidized state, comprises a polysulfide moiety of the formula, $-S_m-$, wherein m is an integer from 3 to 10, and (b) non-activated carbon nanofibers.

The term "electroactive sulfur-containing cathode material," as used herein, relates to cathode active materials which comprise the element sulfur in any form, wherein the electrochemical activity involves the breaking or forming of sulfur-sulfur covalent bonds.

In one embodiment, the electroactive sulfur-containing material comprises elemental sulfur.

In one embodiment, the electroactive sulfur-containing cathode material is organic, that is, it comprises both sulfur atoms and carbon atoms.

In one embodiment, the electroactive sulfur-containing cathode material is polymeric. In one embodiment, the polymeric electroactive sulfur-containing cathode material comprises a carbon-sulfur polymer, and the polysulfide moiety, $-S_m-$, is covalently bonded by one or both of its terminal sulfur atoms on a side group to the polymer backbone chain of said carbon-sulfur polymer material. In one embodiment, the polymeric electroactive sulfur-containing cathode material comprises a carbon-sulfur polymer, and the polysulfide moiety, $-S_m-$, is incorporated into the polymer backbone chain of said carbon-sulfur polymer by covalent bonding of said polysulfide moiety's terminal sulfur atoms.

The nature of the electroactive sulfur-containing cathode materials useful in the practice of this invention may vary widely. The electroactive properties of elemental sulfur and of sulfur-containing materials are well known in the art, and include the reversible formation of lithiated or lithium ion sulfides during the discharge or cathode reduction cycle of the battery cell.

Examples of polymeric electroactive sulfur-containing materials include, but are not limited to, those comprising one or more carbon-sulfur polymers of formulae $(CS_x)_n$ and $(C_2S_z)_n$. Compositions of the general formula $-(CS_x)_n-$ (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al.

Additional examples of polymeric electroactive sulfur-containing materials are those of the general formula $-(C_2S_z)_n-$ (formula II) wherein z ranges from greater than 1 to about 100, and n is equal to or greater than 2, as described in U.S. Pat. No. 5,529,860 and copending U.S. patent application Ser. No. 08/602,323, now abandoned, to Skotheim et al.

The preferred materials of general formulae I and II, in their oxidized state, comprise a polysulfide moiety of the formula, $-S_m-$, wherein m is an integer equal to or greater than 3, or more preferably, wherein m is an integer from 3 to 10. In one embodiment, m is an integer from 3 to 8. In one embodiment, m is an integer from 3 to 6. In one embodiment, m is an integer from 3 to 8. In one embodiment, m is an integer from 6 to 10. In one embodiment, the polysulfide linkage comprises -S-S-S- (i.e., trisulfide). In one embodiment, the polysulfide linkage comprises -S-S-S-S- (i.e., tetrasulfide). In one embodiment, the polysulfide linkage comprises -S-S-S-S-S- (i.e., pentasulfide). In one embodiment, the polysulfide linkage comprises -S-S-S-S-S-S- (i.e., hexasulfide). In one embodiment, the polysulfide linkage comprises -S-S-S-S-S-S-S- (i.e., heptasulfide). In one embodiment, the polysulfide linkage comprises -S-S-S-S-S-S-S-S- (i.e., octasulfide).

The backbone of polymeric electroactive sulfur-containing materials may comprise $-S_m-$ main chain linkages as well as covalently bound $-S_m-$ side groups. Owing to the presence of multiple linked sulfur atoms, $-S_m-$, where m is an integer equal to or greater than 3, in these materials, they possess significantly higher energy densities than corresponding materials containing the disulfide linkage, -S-S-, alone.

Other preferred polymeric electroactive sulftir-containing materials are those comprising carbocyclic repeat groups, as described in copending U.S. Pat. Application titled "Electroactive, Energy-Storing, Highly-Crosslinked, Polysulfide-Containing Organic Polymers for Use in Electrochemical Cells", filed on even date herewith.

Polymeric electroactive sulfur-containing materials of the present invention typically have elemental compositions containing between about 50 weight per cent and 98 weight per cent sulfur. The preferred polymeric electroactive sulfur-containing materials have greater than 75 weight per cent sulfur. The most preferred polymeric electroactive sulfur-containing materials have greater than 86 weight per cent sulfur, and especially most preferred are polymeric electroactive sulfur-containing materials with greater than 90 weight per cent sulfur.

More examples of polymeric electroactive sulfur-containing materials are those comprising organo-sulfur compounds of the formula, $(R(S)_y)_n$, where y=1 to 6; n=2 to 20, and R is one or more different aliphatic or aromatic organic moieties having one to twenty carbon atoms, as described in U.S. Pat. Nos. 4,833,048 and 4,917,974 to DeJonghe et al. Still other examples of polymeric electroactive sulfur-containing materials are organo-sulfur polymers with the general formula $(R(S)_y)_n$, as described in U.S. Pat. No. 5,162,175 to Visco et al. Yet more examples of polymeric electroactive sulfur-containing materials are those comprising a combination of a compound having a disulfide group and a conductive polymer, or an organo-disulfide derivative of a conductive polymer, as described in U.S. Pat. No. 5,324,599 to Oyama et al. Additional examples of electroactive sulfur-containing materials are the organo-sulfur derivatives of metal ions, as described in U.S. Pat. No. 5,516,598 to Visco et al.

Other suitable examples of polymeric electroactive sulfur-containing materials include materials of general formula, $C_vS$, wherein v is a numerical value within the range of about 4 to about 50, as described in U.S. Pat. No. 4,143,214 to Chang et al. Other examples of polymeric electroactive sulfur-containing materials are those which contain one or more polymer compounds having a plurality of carbon monosulfide units that may generally be written as $(CS)_w$, wherein w is an integer of at least 5, as described in U.S. Pat. No. 4,152,491 to Chang et al. Other examples of polymeric electroactive sulfur-containing materials are those containing electron conducting polymers and at least one polysulfurated chain forming a complex with the polymer, as described in U.S. Pat. No. 4,664,991 to Perchaud et. al.

In one embodiment, the electroactive sulfur-containing material comprises a carbon-sulfur polymer having greater than 75 weight per cent of sulfur.

Solid Composite Cathodes

One aspect of the present invention pertains to solid composite cathodes for use in an electric current producing cell, which composite cathodes comprise (a) an electroactive sulfur-containing cathode material, which material, in its oxidized state, comprises a polysulfide moiety of the formula, $-S_m-$ wherein m is an integer from 3 to 10, and (b) non-activated carbon nanofibers, as described herein.

In one embodiment, the solid composite cathode is fabricated from a mixture comprising electroactive sulfur-containing cathode material and non-activated carbon nanofibers, which is deposited onto a current collector. Optionally, the mixture may further comprise conductive additives, polymeric binders, electrolytes, and other additives to further improve the electrochemical recycleability and capacity of the cells.

In one embodiment, the solid composite cathode further comprises a non-electroactive metal oxide, which is added to the cathode coating layer to further improve the access to the electrolyte during the filling process and during the cycling of the cell. This is especially beneficial in increasing the energy density and capacity above that achieved with the electroactive sulfur-containing cathode material (e.g., elemental sulfur, carbon-sulfur polymer materials, and organo-sulfur materials) and non-activated carbon nanofibers only. Examples of these non-electroactive metal oxides include, but are not limited to, silicas, aluminas, silicates, and titanium dioxides.

The relative amounts of electroactive sulfur-containing polymer, non-activated carbon nanofibers, and optional components such as conductive additives, polymeric binders, electrolytes, non-electroactive metal oxides, and other additives in the solid composite cathode may vary widely. Generally these relative amounts are determined by experimentation and chosen so as to optimize the amount of electroactive cathode material present, the energy storage capacity of the cathode, and the electrochemical performance of the solid composite cathode in an electric current producing cell. Typically, the amount of electroactive sulfur-containing material used in the solid composite cathode of the present invention will vary from about 50 weight per cent to 96 weight percent. Preferred are solid composite cathodes comprising between 60 weight per cent and 96 weight per cent sulfur-containing material. Especially preferred are those containing greater than 80 weight per cent of sulfur-containing material.

The relative amounts of sulfur-containing cathode active material and non-activated carbon nanofibers in the composite cathode can vary widely so long as sufficient carbon nanofibers are present to effectively provide the microporosity and electrical conductivity for efficient utilization of the cathode active material consistent with the volumetric density requirements for loading of cathode active material in the cell. In cases where the carbon nanofibers also have additional functions, as for example, increasing the mechanical strength and substrate adhesion of the composite cathode layer, the amount of the carbon nanofibers may be increased over that required for the efficient utilization and loading of the cathode active material. Typically, the amount of non-activated carbon nanofibers used in the composite cathode will vary from 1 weight per cent to about 50 weight per cent of the weight of sulfur-containing cathode active material in the cathode coating layer. Preferred solid composite cathodes are those which comprise between 2 weight per cent and 10 weight percent non-activated carbon nanofibers based on the weight of sulfur-containing cathode active material. Most preferred solid composite cathodes comprise between 3 weight per cent and 6 weight per cent carbon nanofibers based on the weight of the sulfur-containing cathode active material.

The solid composite cathodes of the present invention may further comprise one or more materials selected from the group of conductive additives, polymeric binders, and electrolytes, usually to improve or simplify their fabrication as well as improve their electrical and electrochemical characteristics.

Useful conductive additives or fillers are those known to one skilled in the art of electrode fabrication and are such that they provide electrical connectivity to the majority of the electroactive materials in the composite cathode. Examples of useful conductive additives include, but are not limited to, conductive carbons, graphites, active carbon fibers, metal flakes, metal powders, metal fibers, electrically conductive polymers, and electrically conductive metal chalcogenides.

The choice of polymeric binder material may vary greatly so long as it is inert with respect to the composite cathode materials. Useful binders are those materials that allow for ease of processing of battery electrode composites and are generally known to those skilled in the art of electrode fabrication. Examples of useful binders include, but are not limited to, organic polymers such as polytetrafluoroethylenes, polyvinylidene fluorides, ethylene-propylene-diene (EPDM) rubbers, polyethylene oxides (PEO), UV curable acrylates, UV curable methacrylates, and heat curable divinyl ethers. Examples of other useful binders are cationic polymers with quaternary ammonium salt groups, as described in copending U.S. Pat. Application titled "Electrochemical Cells with Cationic Polymers and Electroactive Sulfur Compounds", filed on even date herewith.

Examples of useful electrolytes include, but are not limited to, liquid, solid, or solid-like materials capable of storing and transporting ions, so long as the electrolyte material is stable electrochemically and chemically with respect to the composite cathode material, and the electrolyte material facilitates the transport of ions. The electrolyte must also be electronically non-conductive to prevent short circuiting between the anode and the cathode.

In those cases where polymeric binder and conductive additive are desired, the amounts of binder and conductive additive may vary widely and the amounts present will depend on the desired performance. Typically, when binders and conductive additives are used, the amount of binder will vary greatly, but will generally be less than about 15 weight per cent of the solid composite cathode. Preferred amounts are less than 10 weight per cent. The amount of conductive additive used will also vary greatly and will typically be less than 15 weight per cent of the solid composite cathode. Preferred amounts of conductive additives are less than 12 weight per cent.

The solid cathodes of the present invention may also further comprise current collectors. Suitable current collectors for use in the present invention are those known to those skilled in the art of electrode fabrication for solid electroactive sulfur-containing cathodes. Examples of suitable current collectors include, but are not limited to, metal films, foils, nets, and expanded metal grids made from metals such as nickel, titanium, aluminum, tin, and stainless steel, and plastic films with conductive layers comprising metals such as aluminum, stainless steel, nickel, titanium, and tin. Such metallic current collectors may optionally have a layer comprising conductive carbon or graphite coated on the metallic layer.

Methods of Making Composite Cathodes

One aspect of the present invention pertains to methods for fabricating solid composite cathodes, as described herein.

One method employs a physical mixture of an electroactive sulfur-containing cathode material, non-activated carbon nanofibers, and optionally conductive additives, polymeric binders, electrolytes, non-electroactive metal oxides, and other additives, either as dry solids, or as a slurry in a solvent or mixture of solvents. The mixture is fabricated into a solid cathode structure of desired dimensions, for example, by casting, doctor blade coating, roll coating, dip-coating, extrusion, calendering, and other means known in the art.

Mixing of the various components can be accomplished using any of a variety of methods so long as the desired dissolution or dispersion of the components and the desired length of the non-activated carbon nanofibers is obtained. Suitable methods of mixing include, but are not limited to, mechanical agitation, grinding, ultrasonication, ball-milling, sand milling, and impingment milling.

The formulated dispersions can be applied to supports or current collectors by any of a variety of well-known coating methods and dried using conventional techniques. Suitable hand coating techniques include, but are not limited to, the use of a coating rod or a gap coating bar. Suitable machine coating methods include, but are not limited to, the use of roller coating, gravure coating, curtain coating, bead coating or slot extrusion coating. Removal of some or all of the liquid from the mixture can be accomplished by any of a variety of conventional means. Examples of suitable methods for the removal of liquid from the mixture include, but are not limited to, hot air convection, heat, infrared radiation, flowing gases, vacuum, reduced pressure, extraction, and by simply air drying if convenient.

Once formed, the solid composite cathode may optionally be calendered to provide a solid composite cathode with a desired thickness, porosity, and volumetric density of electroactive material.

Thus, in one embodiment, the present invention pertains to a method for the preparation of a solid composite cathode, said method comprising the steps of:

(a) dispersing or suspending, in a liquid medium, an electroactive sulfur-containing cathode material, as described herein, and non-activated carbon nanofibers, as described herein;

(b) casting the mixture formed in step (a) onto a substrate or placing the mixture formed in step (a) into a mold; and, (c) removing some or all of the liquid medium from the mixture of step (b) to form a solid or gel-like composite cathode in the shape or form desired.

Examples of liquid media suitable for use in the methods of the present invention include, but are not limited to, aqueous liquid, non-aqueous liquids, and mixtures thereof. Preferred liquids are non-aqueous liquids such as methanol, ethanol, isopropanol, 1-propanol, butanol, tetrahydrofuran, dimethoxyethane, acetone, toluene, xylene, acetonitrile, heptane, and cyclohexane.

Optionally, conductive additives, polymeric binders, electrolytes, non-electroactive metal oxides, and other additives may be added to the mixture at one or more of the various steps in the methods, usually at steps which involve dissolving, dispersing, or mixing. Such additives often facilitate adhesion, cohesion, current collection, and ion transport.

Rechargeable Battery Cells and Methods of Making Same

One aspect of the present invention pertains to an electric current producing cell which comprises:

(a) an anode;
(b) a solid composite cathode, as described herein; and,
(c) an electrolyte interposed between said anode and said cathode.

Another aspect of the present invention pertains to a method of forming an electric current producing cell, which method comprises the steps of:

(a) providing an anode;
(b) providing a solid composite cathode, as described herein; and,
(c) enclosing an electrolyte between said anode and said cathode.

In one embodiment, the electric current producing cell is a secondary (rechargeable) electric current producing cell.

The anode active material of the anode may be comprised of one or more metals or metal alloys or a mixture of one or more metals and one or more alloys, wherein said metals are selected from the Group IA and IIA metals in the Periodic Table. Suitable anode active materials include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are particularly useful for the anode of the cells of the present invention. Preferred anode active materials are lithium metal, lithium-aluminum alloys, lithium-tin alloys, lithium-intercalated carbons, and lithium-intercalated graphites.

The electrolytes used in battery cells function as a medium for storage and transport of ions, and in the special case of solid electrolytes these materials may additionally function as separator materials between the anode and the cathode. Any liquid, solid, or solid-like material capable of storing and transporting ions may be used, so long as the material is electrochemically and chemically inert with respect to the anode and the cathode, and the material facilitates the transport of ions between the anode and the cathode. The electrolyte must also be electronically non-conductive to prevent short circuiting between the anode and the cathode.

Examples of suitable electrolytes for use in the present invention include, but are not limited to, organic electrolytes comprising one or more materials selected from the group consisting of: liquid electrolytes, gel polymer electrolytes, and solid polymer electrolytes.

Examples of useful liquid electrolyte solvents include, but are not limited to, N-methyl acetamide, acetonitrile, carbonates, sulfones, sulfolanes, glymes, siloxanes, dioxolanes, N-alkyl pyrrolidoncs, substituted forms of the foregoing, and blends thereof.

These liquid electrolyte solvents are themselves useful as gel forming (plasticizing) agents for gel-polymer electrolytes. Further examples of useful gel-polymer electrolytes include, but are not limited to, those comprising polymers selected from the group consisting of: polyethylene oxides (PEO), polypropylene oxides, polyacrylonitriles (PAN), polysiloxanes, polyimides, polyethers, sulfonated polyimides, perfluorinated membranes (Nafion™ resins), divinyl polyethylene glycols, polyethylene glycol-bis-(methyl acrylates), polyethylene glycol-bis-(methyl methacrylates), derivatives of the foregoing, copolymers of the foregoing, crosslinked and network structures of the foregoing, and blends of the foregoing; to which is added an appropriate ionic electrolyte salt.

Examples of useful solid polymer electrolytes include, but are not limited to, those comprising polymers selected from the group consisting of: polyethers, polyethylene oxides (PEO), polypropylene oxides, polyimides, polyphosphazenes, polyacrylonitriles (PAN), polysiloxanes, derivatives of the foregoing, copolymers of the foregoing, crosslinked and network structures of the foregoing, and blends of the foregoing; to which is added an appropriate ionic electrolyte salt. Ionically conductive solid polymer electrolytes may additionally function as separator materials between the anode and the cathode.

In addition to solvents, gelling agents and ionically conductive polymers as known in the art for organic electrolytes, the organic electrolyte further comprises one or more ionic electrolyte salts, also as known in the art, to increase the ionic conductivity.

Examples of ionic electrolyte salts for use in the present invention include, but are not limited to, $MClO_4$, $MAsF_6$, $MSO_3CF_3$, $MSO_3CH_3$, $MBF_4$, $MB(Ph)_4$, $MPF_6$,

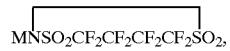

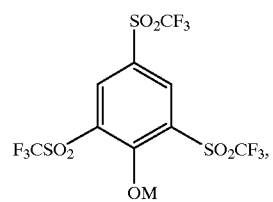

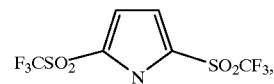

and the like, where M is Li or Na.

Other electrolyte salts useful in the practice of this invention are disclosed in U.S. Pat. No. 5,538,812 to Lee et al. Preferred ionic electrolyte salts are $LiSO_3CF_3$ (lithium triflate) and $LiN(SO_2CF_3)_2$ (lithium imide).

EXAMPLES

Several embodiments of the present invention are described in the following examples, which are offered by way of illustration and not by way of limitation.

Prior to use in the coating mixtures in the following examples, the PYROGRAF-III carbon nanofibers (a trade name for carbon filaments available from Applied Sciences, Inc., Cedarville, Ohio) were pre-washed using acetone as the organic solvent for extraction of impurities and filtering off the carbon nanofibers through a Buchner funnel containing filter paper. The washing step was repeated at least 3 times until the extraction solvent was a pale yellow.

To characterize the non-activated nature of the pre-washed PYROGRAF-III carbon nanofibers, the specific surface area was measured using the conventional BET method with nitrogen and found to be 65 $m^2/g$. To further characterize these non-activated PYROGRAF-III carbon nanofibers, the following procedure was used to determine its adsorption affinity for lithium octasulfide in a tetraglyme solution. The pre-washed PYROGRAF-III carbon nanofibers were dried under vacuum at 80° C. for 18 hours. 0.5 g of these PYROGRAF III carbon nanofibers were added in an argon-filled glove box to 10 ml of a 0.03 M solution of lithium octasulfide in tetraglyme at 25° C. This dispersion was stirred with a mechanical stirrer for 18 hours and then transferred to a sealed centrifuge tube and centrifuged for 30 minutes at 4000 rpm under argon. The supernatant liquid was filtered through a 0.45 micron syringe filter and then was analyzed by absorption spectroscopy using the absorbance at 450 nm for lithium octasulfide. The concentration of lithium octasulfide remaining in the solvent was then calculated using a calibration curve generated by using solutions of various standard concentrations of lithium octasulfide in tetraglyme. The amount of lithium octasulfide adsorbed by the carbon nanofibers was then calculated from the loss of lithium octasulfide from the tetraglyme solution. For the pre-washed PYROGRAF-III carbon nanofibers, the amount of adsorption was 10.45 mg of lithium octasulfide on 0.5 g of carbon nanofibers. This adsorption is only 13% of the lithium octasulfide available in the solution. This indicates the non-activated nature of the pre-washed PYROGRAF-III carbon nanofibers which had a nominal diameter of 200 nm. By contrast, active carbon fibers made from the pyrolysis of rayon fibers had a nominal diameter of 2000 nm, a specific surface area of 1500 $m^2/g$ when measured by the same BET method, and had adsorption of 58.8 mg of lithium octasulfide on 0.5 g of active carbon fibers when tested in the same method as used above for the carbon nanofibers. This adsorption is 74% of the lithium octasulfide available in the tetraglyme solution and indicates the activated nature of these active carbon fibers.

Example 1

A cathode coating layer with a composition by weight of 60% elemental sulfur, 30% pre-washed PYROGRAF-III carbon nanofibers having a nominal diameter of 200 nm, and 10% polyethylene oxide (PEO) was prepared as follows. Carbon nanofibers (3.0 g) were ground in a coffee mill grinder for 6 seconds to disperse any clumping of the nanofibers. Sulfur (6.0 g, Aldrich Chemical Company, Madison, Wis.) was then added and ground with the nanofibers for 4 seconds in the same grinder. The coating paste was prepared by adding to this dry mixture 50 g of a 1% by weight solution of the PEO (molecular weight of 600,000 weight, available from Polysciences Inc., Warrington, Pa.) in water/ethanol (9/1 by volume). This was mixed for 5 minutes in the same grinder to distribute the PEO solution uniformly throughout the coating paste. Approximately 3 to 4 g of the paste was coated on one side of a 175 $\mu$m aluminum EXMET (Exmet Corporation, Naugatuck, Conn.) by using a plastic spatula and then dried in an oven at 90° C. for 2 hours. The other side of the substrate was then coated following the same procedure. After the cathode was dried, it was calendered to a total thickness of 230 $\mu$m. The coated cathode had a loading of elemental sulfur of about 5.4 mg/cm$^2$ on each side and a volumetric density of sulfur of 235 mg/cm$^3$ including the volume of the EXMET grid.

Wound test cells were fabricated with 15 cm$^2$ of the coated cathode, a 100 micron lithium foil anode and a 25 $\mu$m thick CELGARD 2500 (a trademark for a polyolefin separator available from Hoechst Celanese Corporation, Charlotte, N.C.) separator between the cathode and the anode. After winding these components together, the rolled cell was soaked under vacuum with an electrolyte solution of 1.0 M LiSO$_3$CF$_3$ (lithium triflate, available from 3M Corporation, St. Paul, Minn.) in tetraethylene glycol dimethylether (TEGDME)/1,3-dioxolane (1:1 by volume) and then sealed in a glass vial.

Because of the high volumetric density of the cathode, the first two cycles were carried out at a lower current density of 0.25 mA/cm$^2$ for charge and discharge of the cell. After the first two cycles, presumably because a higher surface area was developed in the cathode during cycling, the current density for charging and discharging was increased to 0.33 mA/cm$^2$. A capacity of 3.5 mAh/cm$^2$ and a specific capacity of 650 mAh/g was obtained by the 10th cycle when the cathode had reached its maximum capacity. This capacity faded at a rate of 0.45% per cycle over the next 20 cycles. For about 80% of the discharge time, the voltage curve during discharge was a plateau above 2.0 volts.

Similar wound cells with similar composite cathodes except that there were not carbon nanofibers present in the formulation showed significantly lower amounts of electrolyte filling and more than 50% lower cycling capacity compared to cells with carbon nanofibers.

Example 2

A cathode with a composition of 60% elemental sulfur, 30% pre-washed PYROGRAF-III carbon nanofibers, 5% silica (EH-5, amorphous fumed SiO$_2$ available from Cabot Corporation, Tuscola, Ill.), and 5% PEO (molecular weight 600,000) was made according to the procedure described in Example 1. The same cell construction was used as described in Example 1. The cathode had a total thickness of 165 microns.

Due to the increased wetting of the electrolyte from the presence of the silica, the cathode reached a maximum capacity of 3.5 mAh/cm$^2$ at the 4th cycle with a charge and discharge rate of 0.33 mA/cm$^2$. A capacity of 135 mAh or 4.5 mAh/cm$^2$ and a specific capacity of 830 mAh/g was obtained on the first discharge.

Example 3

A cathode with a composition by weight of 61% elemental sulfur, 31% pre-washed PYROGRAF-III carbon nanofibers, and 8% polytetrafluoroethylene (PTFE) as a binder was prepared by the following method. The carbon nanofibers (15 g) were ground in a coffee mill grinder for 6 seconds to disperse any clumping of the nanofibers. Sulfur (30 g) was then added and grotud with the nanofibers for 4 seconds in the same grinder. The coating paste was prepared by adding to this dry mixture 360 ml of isopropanol in a Kitchen Aid bowl and mixing for about 5 minutes. After the mixture showed an even distribution of the solid constituents, 4.5 ml of PTFE emulsion (60% PTFE in water emulsion available from DuPont Corporation, Wilmington, Del.) was added, and the mixture stirred for 5 minutes. Approximately 3 to 4 g of this paste was coated on one side of an aluminum EXMET using a stainless steel spatula and dried in an oven at 90° C. for 2 hours. After the cathode was dried, it was calendered to a thickness of 330 $\mu$m. The cathode had a loading of elemental sulfur of 3.3 mg/cm$^2$ on each side and a volumetric density of 100 mg sulftir/cm$^3$ including the EXMET grid volume. Cells were wound and filled with electrolyte solution as described in Example 1.

A maximum capacity of 360 mAh or 2.6 mAh/cm$^2$ (specific capacity of 790 mAh/g) was reached at the 7th cycle under charge and discharge rates of 0.36 mA/cm$^2$. A negligible loss in cell capacity was observed over the next 7 cycles when the current density for charge and discharge was increased to 0.54 mA/cm$^2$. The voltage curve during discharge at 0.54 mA/cm$^2$ was above 1.95 V for more than 80% of the discharge time.

Similar composite cathodes except that no carbon nanofibers were present in the formulation showed significantly lower liquid electrolyte filling after winding into AA cells, and had less than 35% of the capacity of the comparable cells with carbon nanofibers.

Example 4

A composite cathode with a composition by weight of 60% elemental sulfur, 10% conductive carbon pigment, 20% pre-washed PYROGRAF-III carbon nanofibers, 5% PEO and 5% PTFE was prepared by the following method.

A 3% by weight solution of PEO (molecular weight 600,00) in water/isopropanol (1:4 by weight) was prepared by slowly adding 5.0 g of PEO to a solution of 32.3 g of deionized water and 129.3 g of isopropanol with constant agitation with a stilTing bar for 12 hours.

Sulfur (60.0 g) and conductive carbon pigment (10.0 g, PRINTEX XE-2, available from Degussa Corporation, Arkon, Ohio) were dry ground with an IKA M20 grinder for 5 seconds for 4 repeated times. To ensure even distribution of the dry components, the ingredients were manually mixed for 5 seconds after every grind. 4.0 g batches of pre-washed PYROGRAF-III carbon nanofibers were also dry ground separately for 6 seconds in the grinder to disperse any clumping of the carbon nanofibers in separate batches to provide a total of 20 g of ground carbon nanofibers.

The sulfur/XE-2 mixture was added to a solution of 166.7 g of the 3% PEO solution prepared as described above, 188 g of isopropanol, and 47 g of water and then agitated with a mechanical mixer for 5 minutes. The solution was additionally mixed for 7 minutes with a sonicator (Cell Disrupter). This resulted in an increase of the viscosity of the solution. The mixture was then mechanically stirred during the dropwise addition of 8.3 g of PTFE emulsion (60% solids), and this mixing was continued for 5 minutes after all the PTFE had been added. The carbon nanofibers (20.0 g) were then manually added to the solution until a paste was formed which was additionally mixed with a hand mixer for 2 minutes.

The paste was coated on an aluminum EXMET by the Rondo roller method, by manually spreading the paste on the aluminum grid. A blotting paper with about the same surface area as the grid was placed above the paste sample to prevent the paste from sticking to the rolls. The grid, paste, and the blotting paper were rolled through the Rondo unit two times. The loading of sulfur in the paste cathode coating was in the range of 2.5 to 3.1 mg/cm$^2$, with an average cathode thickness of 204 μm.

Figure 2:
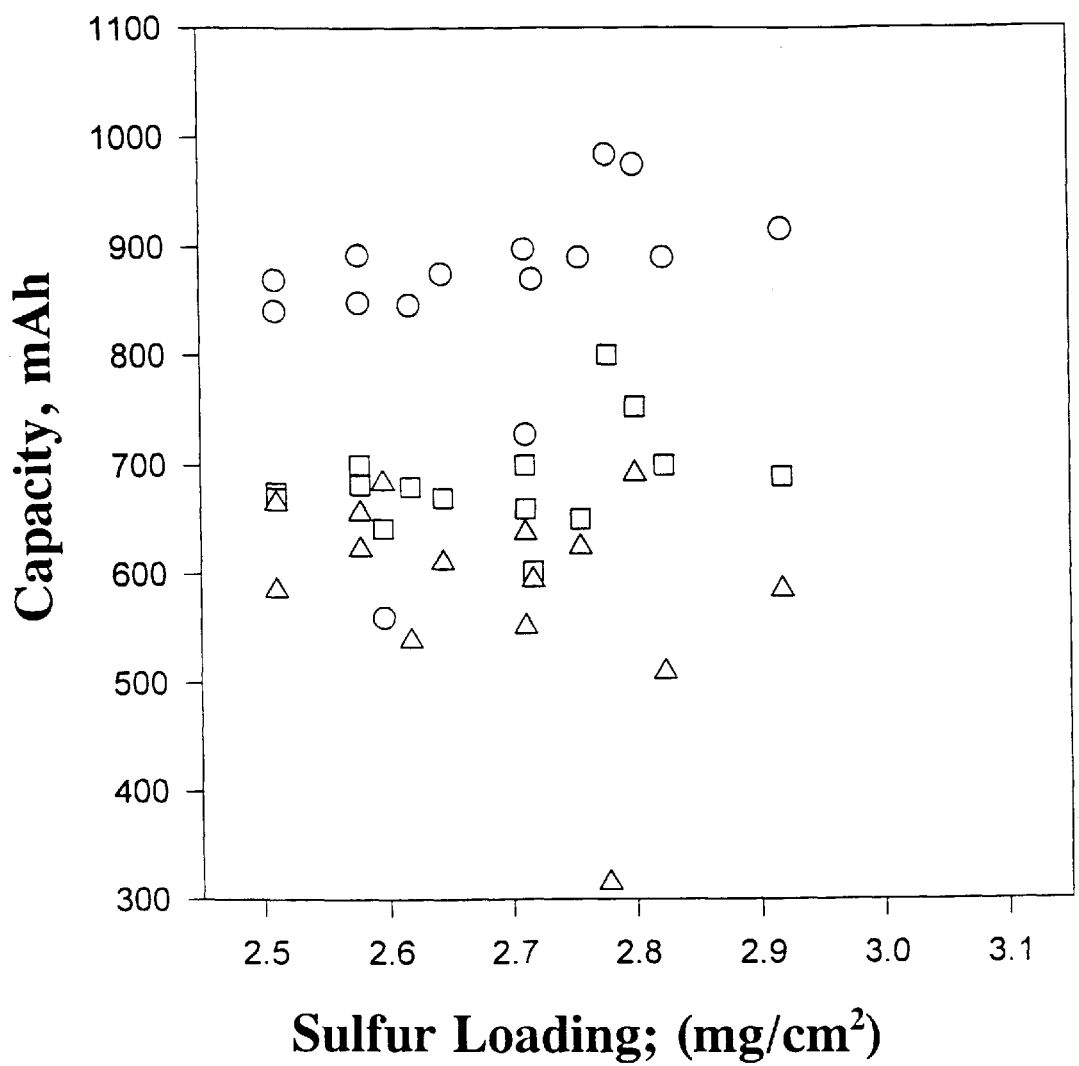
FIG. 2 shows the capacity and cycling behavior of 13 AA cells with solid composite cathodes comprising elemental sulfur and carbon nanofibers as described in Example 4. Open circles show the 1st Cycle; open squares show the 5th cycle; and open triangles show the 10th cycle.

AA cells were assembled by combining a 100 micron lithium foil, a 25 micron thick CELGARD 2500 separator, and the paste coated cathode into a roll and inserting this roll into a AA cell casing followed by filling with an electrolyte solution of 1.0 M LiN(SO$_2$CF$_3$)$_2$ (lithium imide, available from 3M Corporation, St. Paul, Minn.) in a 5/2/2/1 blend by volume of 1,3-dioxolane/diglyme/dimethoxyethane (DME)/sulfolane. All cells were tested with charge and discharge at 100 mA for the first cycle followed by discharge under GSM conditions that averaged a charge density of 165 mA and by charge at 75 mA with a constant time of 14 hours. FIG. 2 shows the capacity of 13 of these AA cells after the 1st (open circles), 5th (open squares) and 10th (open triangle) cycles. The average capacity for the 13 cells was 859 mAh after the 1st cycle, 685 mAh after the 5th cycle, and 592 mAh after the 10th cycle. The average specific capacity for these 13 cells was 1193 mAh/g after the 1st cycle, 952 mAh/g after the 5th cycle, and 824 mAh/g after the 10th cycle.

Example 5

Figure 3:
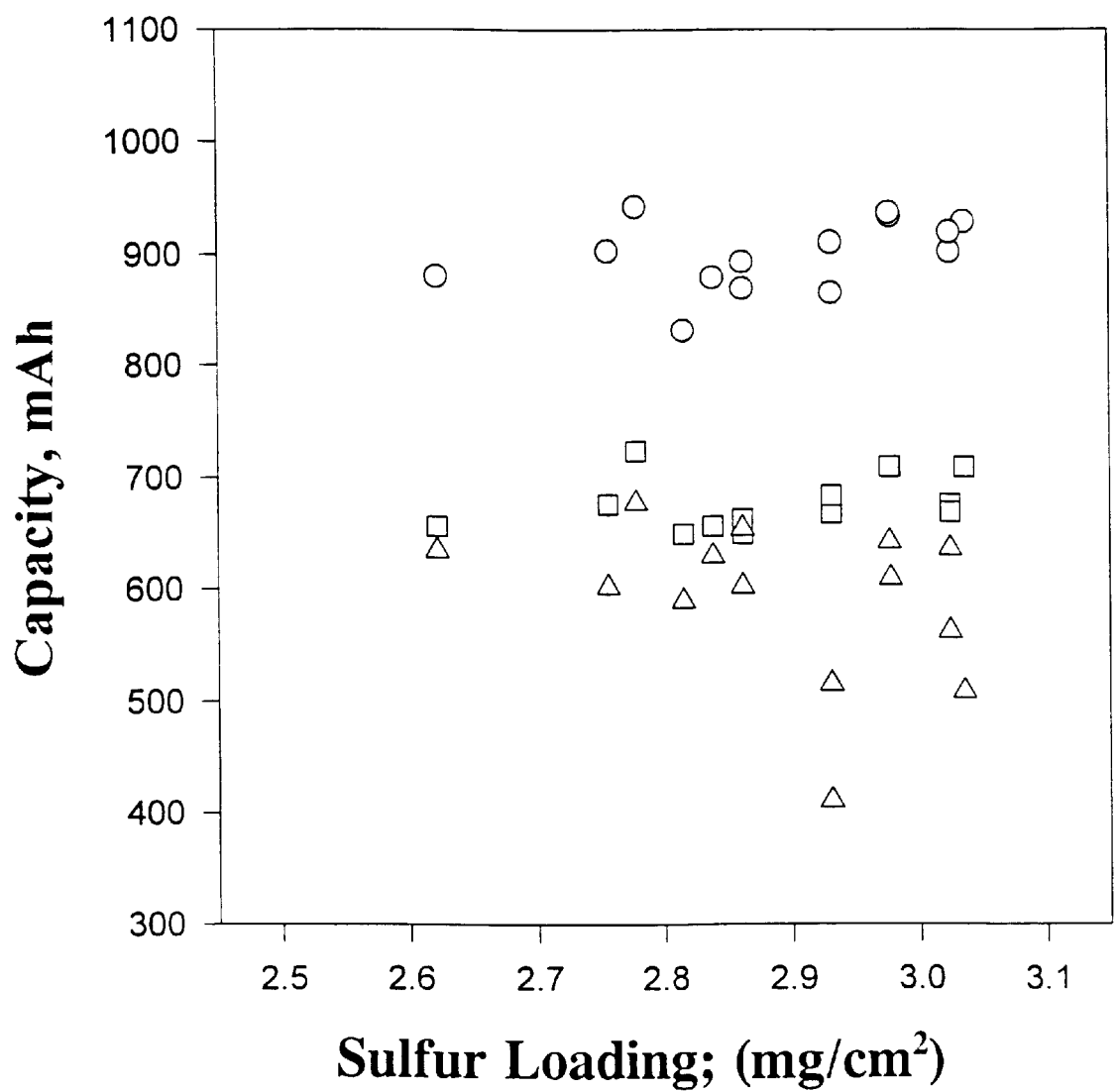
FIG. 3 shows the capacity and cycling behavior of 13 AA cells with solid composite cathodes comprising elemental sulfur, carbon nanofibers, and silica pigment as described in Example 5. Open circles show the 1st Cycle; open squares show the 5th cycle; and open triangles show the 10th cycle.

A paste cathode coating was prepared as described in Example 4 except that 5 g of silica pigment was substituted for the 5 g of PEO by combining 60 g of sulfur, 10 g of conductive carbon pigment (XE-2), and 5 g of silica in the mixture before the addition of the PTFE and the carbon nanofibers. Cell assembly and testing was performed as described in Example 4. FIG. 3 shows the capacity of 13 of these AA cells after the 1st (open circles), 5th (open squares), and 10th (open triangles) cycles. The average capacity for these 13 cells was 900 mAh after the 1st cycle, 679 mAh after the 5th cycle, and 592 mAh after the 10th cycle. The average specific capacity for these 13 cells was 1202 mAh/g after the 1st cycle, 907 mAh/g after the 5th cycle, and 791 mAh/g after the 10th cycle.

Example 6

A cathode coating layer with a composition by weight of 85% elemental sulfur, 12% conductive carbon pigment (XE-2), and 3% pre-washed PYROGRAF-III carbon nanofibers was prepared by the following method. Two batches of 33.5 g of sulfur, 4.68 g of conductive carbon pigment, and 1.17 g of carbon nanofibers were dry ground in a IKA M20 grinder for 5 seconds for 4 repeated times. To ensure even distribution of the dry components, the ingredients were manually mixed for 5 seconds after every grind. Both batches were blended with 522 g of isopropanol in a Cowles mechanical mixer for 15 minutes and then poured into a Eiger mill for a 20 minute dispersion time to form a slurry with a solids content of 7%. The slurry was coated (hand drawn with a gap coating bar) on a 17.5 micron double sided carbon coated aluminum current collector (product no. 60303 available from Rexam Graphics). After drying under ambient conditions overnight followed by 1 hour at 60° C. under vacuum, the cathode showed good mechanical strength. The composite cathode had a loading of active material of 1.2 mg/cm$^2$ on each side of the current collector and a total volumetric density of 550 mg/cm$^3$.

Wound AA size cells were assembled using 600 cm$^2$ of the coated cathode layer, a 50 μm lithium anode and a 25 μm E25 SETELA (a tradename for a polyolefin separator available from Tonen Chemical Corporation, Tokyo, Japan, and also available from Mobil Chemical Company, Films Division, Pittsford, N.Y.) separator between the cathode and the anode. A mixture of dimethoxyethane (DME) and 1,3-dioxolane (1/1 by volume) with 1.0 M lithium triflate was used as the electrolyte.

Figure 4:
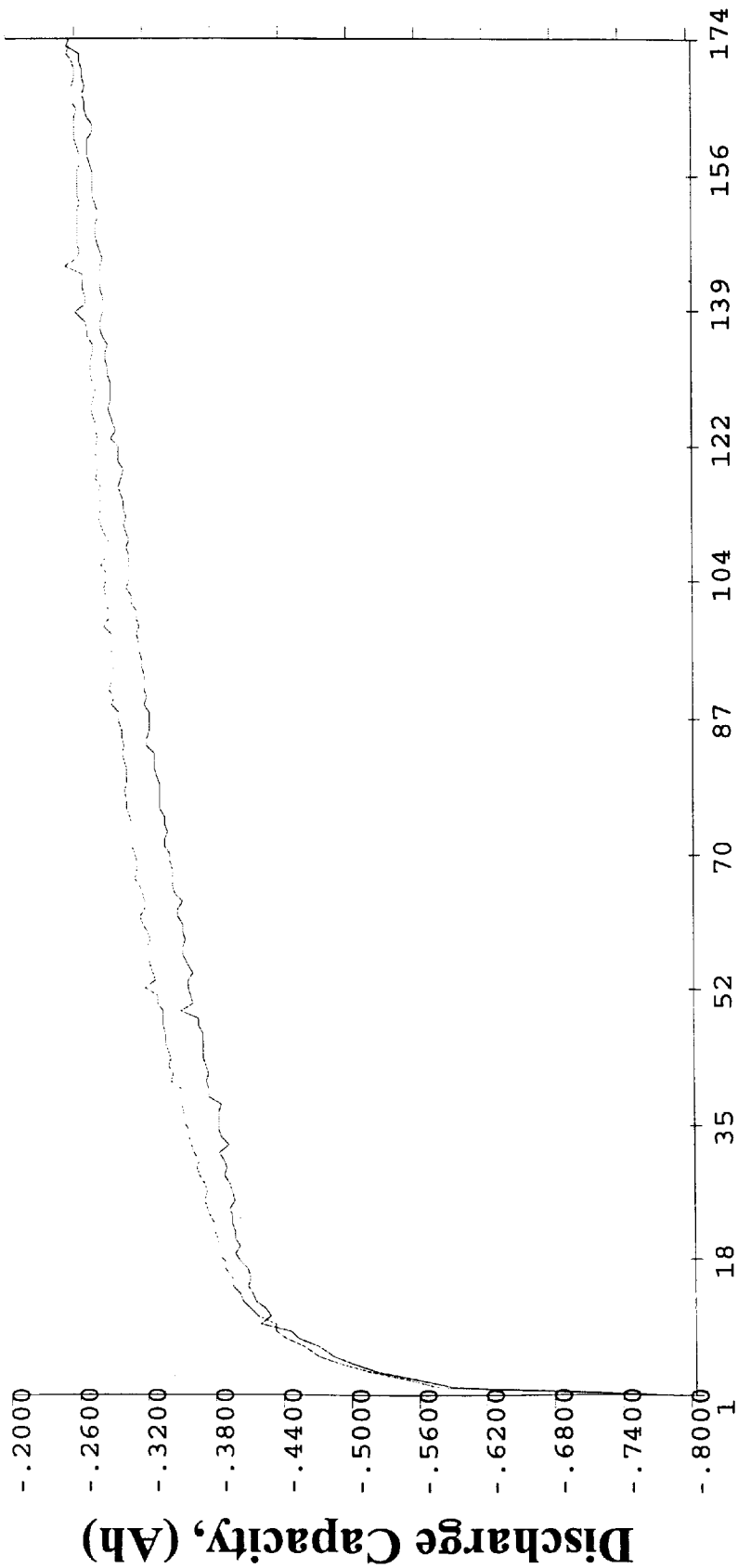
FIG. 4 shows the capacity verses cycle number behaviors for two AA cells with solid composite cathodes containing carbon nanofibers and elemental sulfur as described in Example 6.

FIG. 4 shows the capacity verus cycle number for two AA cells cycled at a charge density of 150 mA (0.3 mA/cm$^2$) and a discharge density of 250 mA (0.5 mA/cm$^2$). The cathodes demonstrated good cycling capacity for more than 140 cycles. A capacity fade of about 0.25% per cycle was calculated between the $10_{th}$ and $140^{th}$ cycle. A specific volumetric capacity of 350 mAh/cm$^3$ was obtained.

Similar composite cathodes with a composition without carbon nanofibers showed lower mechanical stability, lower amounts electrolyte filling, and hence lower electrolyte penetration compared to the cathodes with 3% carbon nanofibers by weight. These cells also showed more than 50% lower cycling capacity and a higher capacity loss on cycling than cells with carbon nanofibers.

Example 7

A composite paste cathode with a composition by weight of 65% carbon-sulfur polymer (made by the process described in Example 2 in a copending application titled "Electroactive, Energy-Storing, Highly Crosslinked, Polysulfide-Containing Organic Polymers for Use in Electrochemical Cells," filed on even day herewith by the common assignee), 10% conductive carbon pigment (PRINTEX XE-2), 20% PYROGRAF-III carbon nanofibers; 5% SiO$_2$ (AEROSIL 380, Degussa Corporation, Akron, Ohio, and 5% PTFE polymer was prepared by following method.

The carbon-sulfur polymer was first pre-ground in a IKA grinder to disperse any clumping of the polymer particles (mean particle size of 8–10 μm). A coating paste was then prepared using a water/isopropanol solvent(4:1 by volume) by the paste method described in Example 3. The solids content of the paste was 18%. The paste was extruded onto a aluminum EXMET current collector, and the cathode dried for 1 hour at 60° C. in a vacuum oven. The resulting composite cathode had a thickness of 216 to 265 μm with a total loading of carbon-sulfur polymer of 3.3 to 4.2 mg/cm$^2$.

Figure 5:
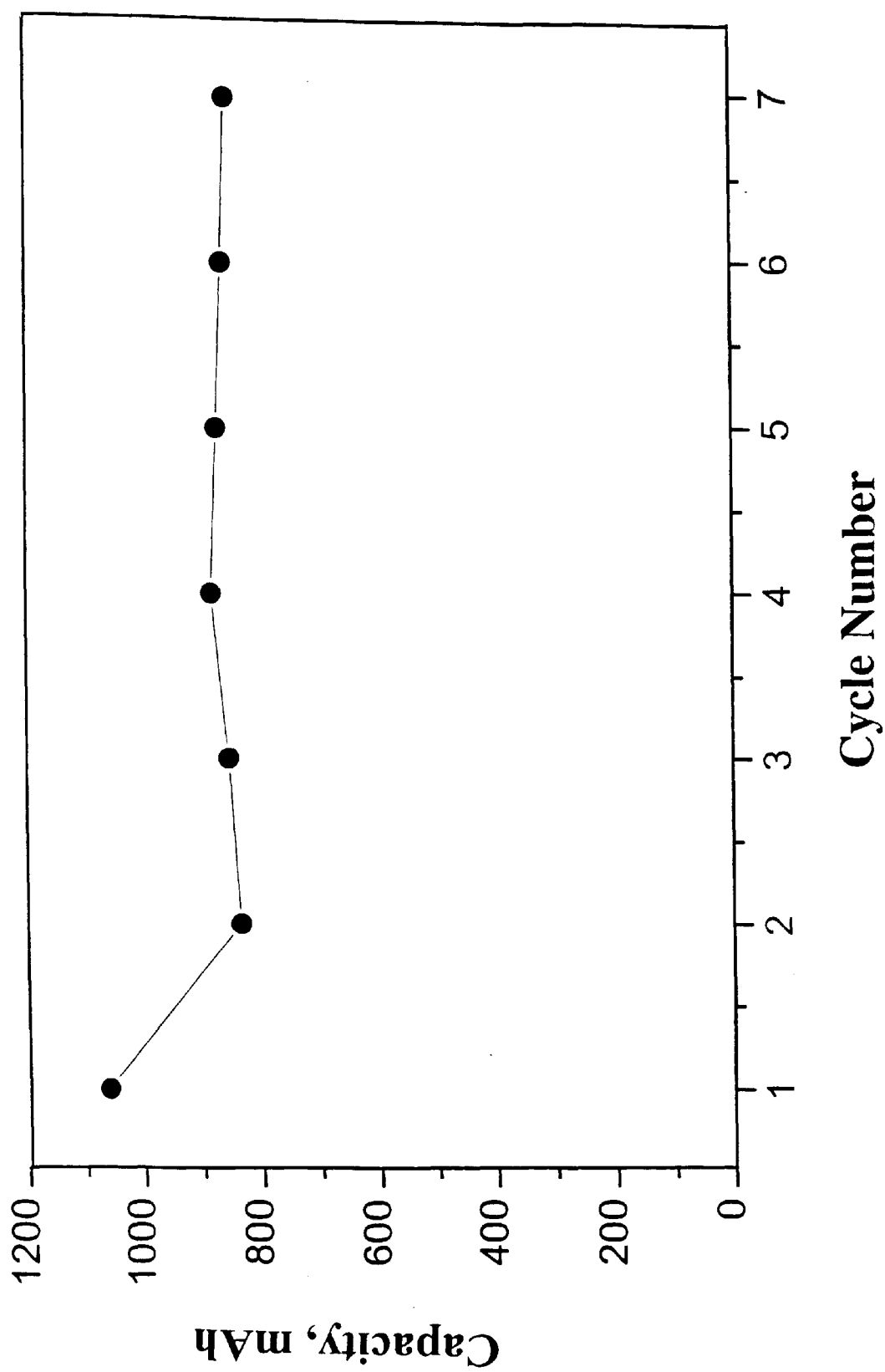
FIG. 5 shows a plot of cell capacity versus cycle number for a AA lithium battery cell with a solid composite cathode containing a carbon-sulfur polymer and carbon nanofibers as described in Example 7.

Wound AA size cells were fabricated with the above composite cathodes, 100 μm lithium anode and a 25 μm E25 SETELA separator. The cells were filled with a liquid electrolyte (50% 1,3-dioxolane, 45% dimethoxyethane and 5% o-xylene) with 1.3 M Li triflate salt. The cells were cycled at a rate of charge and discharge of 0.33 mA/cm$^2$ and 0.72 mA/cm$^2$ respectively. Cell performance data for one cell is shown in FIG. 5. The composite cathode comprising the carbon-sulfur polymer and carbon nanofibers had excellent capacity and stability, with a total cell capacity at the $5^{th}$ cycle of 872 mAh and a specific capacity of 894 mAh/g.

Cells with similar composite paste based cathode, except with no carbon nanofibers present, showed lower mechanical stability of the cathode, more than 30% lower amounts of liquid electrolyte filling, and hence lower electrolyte penetration compared to the cells with cathodes with 20% carbon nanofibers. These cells showed more than 50% lower cycling capacity and a higher capacity loss on cycling than the cells with carbon nanofibers.

Example 8

Composite cathodes were fabricated from a carbon-sulfur polymer (made as described in Example 7). The polymer was first pre-ground to disperse any clumping of the polymer particles (typical mean particle size <10 $\mu$m). A cathode slurry was prepared with a formulation of 70% carbon-sulfur polymer, 10% conductive carbon pigment (PRINTEX XE-2), 5% non-activated PYROGRAF-III carbon nanofibers, 5% $SiO_2$ (AEROSIL 380) and 10% polyethylene oxide (PEO with a molecular weight of 5,000,000 available from Polysciences Inc., Warrington, Pa.) by weight, dissolved in a mixed solvent of water and n-propanol (80:20 volume ratio) in a ball mill jar containing ceramic cylinders. The solids content of the slurry was 12 wt %. The mixture was ball milled for 20 hours. The slurry was cast (hand draw with a gap coater bar) onto both sides of a 17.5 $\mu$m thick conductive carbon coated aluminum foil (Product No. 60303 available from Rexam Graphics, South Hadley, Mass.) as a current collector. The coating was dried under ambient conditions overnight, and then under vacuum at 60° C. for one hour. The resulting dry cathode coating had a thickness in the range of 20 to 25 $\mu$m on each side of the current collector, with a density or loading of electroactive carbon-sulfur polymer of about 1.64 mg/cm$^2$ per side. The volumetric density of the carbon-sulfur polymer in the composite cathode layer was in the range of 377 to 393 mg/cm$^3$.

Wound AA size cells were fabricated with a 75 $\mu$m lithium anode and a 25 $\mu$m E25 SETELA separator. The cells were filled with a liquid electrolyte (50% 1,3-dioxolane, 35% diglyme, 10% dimethoxyethane (DME) and 5% o-xylene by volume with 1.0 M lithium triflate salt (3M Corporation, St. Paul, Minn.)). Cells were cycled at a rate of charge and discharge of 0.25 mA/cm$^2$ and 0.40 mA/cm$^2$, respectively. Cell performance data at 25° C. showed that the composite cathodes comprising carbon nanofibers and carbon-sulfur polymer had excellent capacity with a total capacities of about 566 mAh and specific capacities of more than 830 mAh/g at the 5th cycle. The cathodes also demonstrated good capacity stability out to 100 cycles.

Similar composite cathodes with 70% carbon-sulfur polymer and 15% PRINTEX XE-2, but without carbon nanofibers, showed significantly lower mechanical stability and reduced cycling capacity when wound into AA cells, filled with liquid electrolyte and cycled as done for the cells containing 5% carbon nanofibers.

Example 9

Composite cathodes comprising a carbon-sulfur polymer (made as described in Example 7) and carbon nanofibers were prepared by the method and with the composition described in Example 8. The resulting dry cathode coating had a thickness of about 20 to 25 $\mu$m on each side of the current collector, with a density or loading of carbon-sulfur polymer in the range of 0.63 to 0.97 mg/cm$^2$. The volumetric density of the carbon-sulfur polymer in the composite cathode layer was around 319 to 385 mg/cm$^3$.

Figure 6:
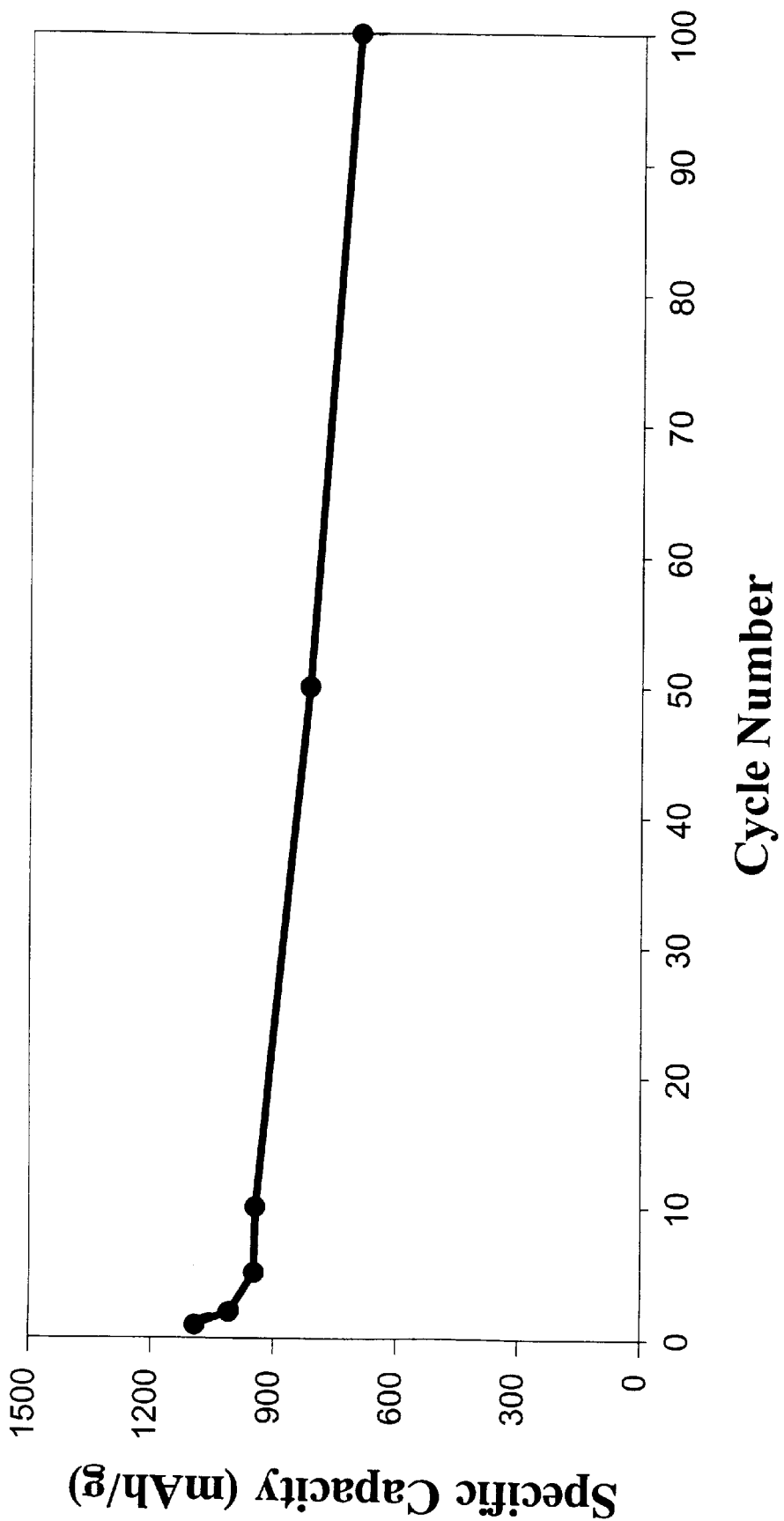
FIG. 6 shows a plot of cell specific capacity versus cycle number for a AA lithium battery cell with a solid composite cathode comprising carbon-sulfur polymer and carbon nanofibers for up to 100 cycles.

Wound AA size cells were fabricated from these cathodes with a 75 $\mu$m lithium anode and a 25 $\mu$m E25 SETELA separator. The cells were filled with a liquid electrolyte (50% 1,3-dioxolane, 20% diglyme, 10% sulfolane and 20% dimethoxyethane by volume with 1.0 M lithium triflate salt). The cell were cycled at a rate of charge and discharge of C/3 (0.2 mA/cm$^2$) and C/2 (0.33 mA/cm$^2$) respectively. Cell performance data at 25° C. (FIG. 6) showed that the carbon-sulfur polymer cathode had excellent capacity and good stability, with specific capacities of: about 1000 mAh/g for the first 10 cycles and 700 mAh/g at the 100th cycle. The cells showed a low rate of capacity loss with cycling with a value of around 0.29% per cycle.

Example 10

A cathode slurry comprising a carbon-sulfur polymer (made as described in Example 7) was prepared by the method described in Example 8. The formulation of the slurry was 83% carbon-sulfur polymer, 10% PRINTEX XE-2 conductive carbon pigment, 2% PYROGRAF-III carbon nanofibers, 4% poly(acrylamide-co-diallyldimethylammonium chloride (available from Aldrich Chemical Company, Milwaukee, Wis.), and 1% polyethyleneoxide by weight with water as the solvent. The slurry had a solids content of 12.0 wt %. The slurry was cast (hand draw with a gap coater bar) onto both sides of a 17.5 $\mu$m thick conductive carbon coated aluminum foil (Product No. 60303, Rexam Graphics) as a current collector. The coatings were dried under ambient conditions overnight, and then under vacuum at 60° C. for one hour. The resulting dry cathode coating had a thickness of about 22 $\mu$m on each side of the current collector, with a density of electroactive carbon-sulfur polymer of about 1.1 mg/cm$^2$. The volumetric density of the electroactive carbon-sulfur polymer was around 485 mg/cm$^3$.

Wound AA size cells were fabricated from these cathodes with a 50 $\mu$m thick lithium anode and a 25 $\mu$m E25 SETELA separator. The cells were filled with a liquid electrolyte (50% 1,3-dioxolane, 45% dimethoxyethane (DME), and 5% o-xylene of this volume with 1.0 M lithium imide salt). The cells were cycled at a rate of charge and discharge of C/2 (0.35 mA/cm$^2$) and C/1.5 (0.49 mA/cm$^2$) respectively. Cell performance data showed that these carbon-sulfur polymer composite cathodes had excellent specific capacity and stability under these conditions, similar to the cell data shown in FIG. 6.

While the invention has been described in detail and with reference to specific embodiments thereof, it will be apparent to one skilled in the art that various changes and modifications can be made without departing from the spirit and scope thereof.

What is claimed is:

1. A solid composite cathode for use in an electric current producing cell, said solid composite cathode comprising:
    (a) an electrically conductive cathode coating layer comprising (i) an electroactive sufur-containing material which, in its oxidized state, comprises a polysulfide moiety of the formula, -$S_m$-, wherein m is an integer from 3 to 10; and (ii) one or more conductive fillers other than a non-activated carbon nanofiber; and
    (b) non-activated carbon nanofibers, wherein said carbon nanofibers have a specific surface area of less than 600 m$^2$/g, and an aspect ratio of at least 20, and wherein individual carbon nanofibers form a random, three dimensional, microporous network in said cathode coating layer;
    wherein said cathode coating layer comprises 50% or greater by weight of said electroactive sulfur-containing material, and the weight ratio of said carbon nanofibers to said electroactive sulfur-containing material in said cathode coating layer is in the range of 0.01:1 to 0.1:1.

2. The solid composite cathode of claim 1, wherein said carbon nanofibers have a diameter of less than 500 nm.

3. The solid composite cathode of claim 1, wherein said carbon nanofibers have a diameter of less than 200 nm.

4. The solid composite cathode of claim 1, wherein said carbon nanofibers have a diameter of less than 100 nm.

5. The solid composite cathode of claim 1, wherein said carbon nanofibers have an aspect ratio of at least 50.

6. The solid composite cathode of claim 1, wherein said carbon nanofibers have a specific surface area of less than 300 m$^2$/g.

7. The solid composite cathode of claim 1, wherein said carbon nanofibers have a specific surface area of less than 100 m$^2$/g.

8. The solid composite cathode of claim 1, wherein said electroactive sulfur-containing material comprises elemental sulfur.

9. The solid composite cathode of claim 1, wherein said electroactive sulfur-containing material comprises a carbon-sulfur polymer.

10. The solid composite cathode of claim 9, wherein m is an integer from 6 to 10.

11. The solid composite cathode of claim 9, wherein said polysulfide moiety, -S$_m$-, is covalently bonded by one or both of its terminal sulfur atoms on a side group to the polymer backbone chain of said carbon-sulfur polymer.

12. The solid composite cathode of claim 9, wherein said polysulfide moiety, -S$_m$-, is incorporated by covalent bonds to both of its terminal sulfur atoms into the polymer backbone chain of said carbon-sulfur polymer.

13. The solid composite cathode of claim 9, wherein said carbon-sulfur polymer material comprises greater than 75 weight per cent of sulfur.

14. The solid composite cathode of claim 1, wherein said one or more conductive fillers are selected from the group consisting of conductive carbons, graphites, active carbon fibers, metal flakes, metal powders, metal fibers, electrically conductive polymers, and electrically conductive metal chalcogenides.

15. The solid composite cathode of claim 1, wherein said cathode coating layer further comprises a binder.

16. The solid composite cathode of claim 1, wherein said cathode coating layer further comprises an electrolyte.

17. The solid composite cathode of claim 1, wherein said cathode coating layer further comprises a non-electroactive metal oxide selected from the group consisting of silicas, aluminas, silicates, and titanium dioxides.

18. The solid composite cathode of claim 7, wherein said non-activated carbon nanofibers have an aspect ratio of at least 50.

19. The solid composite cathode of claim 1, wherein said non-activated carbon nanofibers have a specific surface area of less than 100 m$^2$/g;
    wherein said cathode coating layer comprises 10% or greater by weight of said one or more conductive fillers.

20. The solid composite cathode of claim 19,
    wherein said cathode coating layer further comprises a non-electroactive metal oxide selected from the group consisting of silicas, aluminas, silicates, and titanium oxides.

21. The solid composite cathode of claim 1, wherein the weight ratio of said one or more conductive fillers to said carbon nanofibers in said cathode coating layer is greater than 1:1.

22. The solid composite cathode of claim 1, wherein the weight ratio of said one or more conductive fillers to said carbon nanofibers in said cathode coating layer is equal to or greater than 2:1.

23. The solid composite cathode of claim 1, wherein the weight ratio of said one or more conductive fillers to said carbon nanofibers in said cathode coating layer is equal to or greater than 4:1.

24. The solid composite cathode of claim 1, wherein the weight ratio of said one or more conductive fillers to said carbon nanofibers in said cathode coating layer is equal to or greater than 5:1.

25. The solid composite cathode of claim 1, wherein said cathode coating layer comprises 10% or greater by weight of said one or more conductive fillers.

26. The solid composite cathode of claim 1, wherein said cathode coating layer comprises 60% or greater by weight of said electroactive sulfur-containing material.

27. The solid composite cathode of claim 1, wherein said cathode coating layer comprises 80% or greater by weight of said electroactive sulfur-containing material.

28. The solid composite cathode of claim 1, wherein said non-activated carbon nanofibers have a low adsorption of soluble polysulfides;
    wherein the adsorption by said carbon nanofibers is characterized by adsorption of 13% or less of the lithium octasulfide in a 0.03 M solution of lithium octasulfide in tetraglyme with said carbon nanofibers present at a concentration of 50 grams per liter.

29. An electric current producing cell comprising:
    (a) an anode;
    (b) a solid composite cathode comprising:
        (i) an electrically conductive cathode coating layer comprising (1) an electroactive sulfur-containing material which, in its oxidized state, comprises a polysulfide moiety of the formula, -S$_m$-, wherein m is an integer from 3 to 10, and (2) one or more conductive fillers other than a non-activated carbon nanofiber; and
        (ii) non-activated carbon nanofibers, wherein said carbon nanofibers have a specific surface area of less than 600 m$^2$/g and an aspect ratio of at least 20, and wherein individual carbon nanofibers form a random, three dimensional, microporous network in said cathode coating layer;
            wherein said cathode coating layer comprises 50% or greater by weight of said electroactive sulfur-containing material, and the weight ratio of said carbon nanofibers to said electroactive sulfur-containing material in said cathode coating layer is in the range of 0.01:1 to 0.1:1; and
    (c) an electrolyte interposed between said anode and said cathode.

30. The cell of claim 28, wherein said anode comprises one or more anode active materials selected from the group consisting of: lithium metal, lithium-aluminum alloys, lithium-tin alloys, lithium-intercalated carbons, and lithium-intercalated graphites.

31. The cell of claim 28, wherein said electrolyte comprises one or more materials selected from the group consisting of: liquid electrolytes, gel polymer electrolytes, and solid polymer electrolytes.

32. The cell of claim 29, wherein said electrolyte comprises:
    (a) one or more polymers selected from the group consisting of polyethers, polyethylene oxides, polypropylene oxides, polyimides, polyphosphazenes, polyacrylonitriles, and polysiloxanes; and
    (b) one or more ionic electrolyte salts.

33. The cell of claim 29, wherein said electrolyte comprises:
(a) one or more electrolyte solvents selected from the group consisting of:
N-methyl acetamide, acetonitrile, carbonates, sulfolanes, sulfones, N-alkyl pyrrolidones, dioxolanes, glymes, and siloxanes; and,
(b) one or more ionic electrolyte salts.

34. The cell of claim 29, wherein said carbon nanofibers have a diameter of less than 500 nm.

35. The cell of claim 29, wherein said carbon nanofibers have a specific surface area of less than 100 m$^2$/g.

36. The cell of claim 29, wherein said electroactive sulfur-containing material comprises elemental sulfur or a carbon-sulfur polymer.

37. The cell of claim 29, wherein said one or more conductive fillers are selected from the group consisting of conductive carbons, graphites, active carbon fibers, metal flakes, metal powders, metal fibers, electrically conductive polymers, and electrically conductive metal chalcogenides.

38. The cell of claim 29, wherein said cathode coating layer further comprises a non-electroactive metal oxide selected from the group consisting of silicas, aluminas, silicates, and titanium dioxides.

39. The cell of claim 21, wherein said cathode coating layer comprises 10% or greater by weight of said one or more conductive fillers.

40. A method of forming a cathode coating layer of a solid composite cathode, wherein said method comprises the steps of:
(a) dispersing or suspending, in a liquid medium, an electroactive sulfur-containing material which, in its oxidized state, comprises a polysulfide moiety of the formula, -$S_m$-, wherein in is an integer from 3 to 10, one or more conductive fillers other than a non-activated carbon nanofiber, and non-activated carbon nanofibers, wherein said carbon nanofibers have a specific surface area of less than 600 m$^2$/g and an aspect ratio of at least 20;
(b) casting the mixture formed in step (a) onto a substrate or placing the mixture formed in step (a) into a mold; and
(c) removing some or all of the liquid medium from the mixture of step (b) to form said cathode coating layer, wherein individual carbon nanofibers form a random, three dimensional, microporous network in said cathode coating layer, and wherein said cathode coating layer comprises 50% or greater by weight of said electroactive sulfr-containing material, and the weight ratio of said carbon nanofibers to said clectroactive sulfur-containing material in said cathode coating layer is in the range of 0.01:1 to 0.1:1.

41. A method of forming an electric current producing cell, said method comprising the steps of:
(a) providing an anode;
(b) providing a solid composite cathode comprising:
(i) an electrically conductive cathode coating layer comprising (1) an electroactive sulfur-containing material which, in its oxidized state, comprises a polysulfide moiety of the formula, -$S_m$-, wherein m is an integer from 3 to 10, and (2) one or more conductive fillers other than a non-activated carbon nanofiber; and
(ii) non-activated carbon nanofibers, wherein said carbon nanofibers have a specific surfce area of less than 600 m$^2$/g and an aspect ratio of at least 20, wherein individual carbon nanofibers form a random, three dimensional, microporous network in said cathode coating layer;
wherein said cathode coating layer comprises 50% or greater by weight of said electroactive sulfur-containing material, and the weight ratio of said carbon nanofibers to said electroactive sulfur-containing material in said cathode coating layer is in the range of 0.01:1 to 0.1:1; and
(c) interposing an electrolyte between said anode and said cathode.

42. The method of claim 41, wherein said carbon nanofibers have a diameter of less than 500 nm.

43. The method of claim 41, wherein said carbon nanofibers have a specific surface area of less than 100 m$^2$/g.

44. The method of claim 41, wherein said electroactive sulfur-containing material comprises elemental sulfur or a carbon-sulfur polymer.

45. The method of claim 41, wherein said one or more conductive fillers are selected from the group consisting of conductive carbons, graphites, active carbon fibers, metal flakes, metal powders, metal fibers, electrically conductive polymers, and electrically conductive metal chalcogenides.

46. The method of claim 41, wherein said cathode coating layer further comprises a non-electroactive metal oxide selected from the group consisting of silicas, aluminas, silicates, and titanium dioxides.

47. The method of claim 41, wherein said cathode coating layer comprises 10% or greater by weight of said one or more conductive fillers.

\* \* \* \* \*